Feb. 12, 1963 C. O. MERCHANT 3,077,095
HORIZONTAL TUBE FLARING MACHINE
Filed April 1, 1957 23 Sheets-Sheet 1

INVENTOR.
CHESTER O. MERCHANT
BY
Charles L. Lovercheck
ATTORNEY

Feb. 12, 1963

C. O. MERCHANT 3,077,095

HORIZONTAL TUBE FLARING MACHINE

Filed April 1, 1957

INVENTOR.
CHESTER O. MERCHANT
BY
Charles L. Lovercheck
ATTORNEY

Feb. 12, 1963  C. O. MERCHANT  3,077,095
HORIZONTAL TUBE FLARING MACHINE
Filed April 1, 1957  23 Sheets-Sheet 3

INVENTOR.
CHESTER O. MERCHANT
BY
Charles L. Lovercheck
ATTORNEY

INVENTOR.
CHESTER O. MERCHANT
BY
Charles L. Lovercheck
ATTORNEY

Feb. 12, 1963  C. O. MERCHANT  3,077,095
HORIZONTAL TUBE FLARING MACHINE
Filed April 1, 1957  23 Sheets-Sheet 7

INVENTOR
CHESTER O. MERCHANT
BY:
Charles L. Lovercheck
ATTORNEY

Feb. 12, 1963 C. O. MERCHANT 3,077,095
HORIZONTAL TUBE FLARING MACHINE
Filed April 1, 1957 23 Sheets-Sheet 8

INVENTOR.
CHESTER O. MERCHANT
BY
Charles L. Lovercheck
ATTORNEY

Feb. 12, 1963

C. O. MERCHANT 3,077,095

HORIZONTAL TUBE FLARING MACHINE

Filed April 1, 1957

INVENTOR
CHESTER O. MERCHANT
BY:
Charles L. Lovercheck
ATTORNEY

Feb. 12, 1963 C. O. MERCHANT 3,077,095
HORIZONTAL TUBE FLARING MACHINE
Filed April 1, 1957 23 Sheets-Sheet 11

INVENTOR.
CHESTER O. MERCHANT
BY
Charles L. Lovercheck
ATTORNEY

Feb. 12, 1963 C. O. MERCHANT 3,077,095
HORIZONTAL TUBE FLARING MACHINE
Filed April 1, 1957 23 Sheets-Sheet 13

INVENTOR.
CHESTER O. MERCHANT
BY
Charles L. Lovercheck
ATTORNEY

Feb. 12, 1963 C. O. MERCHANT 3,077,095
HORIZONTAL TUBE FLARING MACHINE
Filed April 1, 1957 23 Sheets-Sheet 14

INVENTOR.
CHESTER O. MERCHANT
BY
Charles L. Lovercheck
ATTORNEY

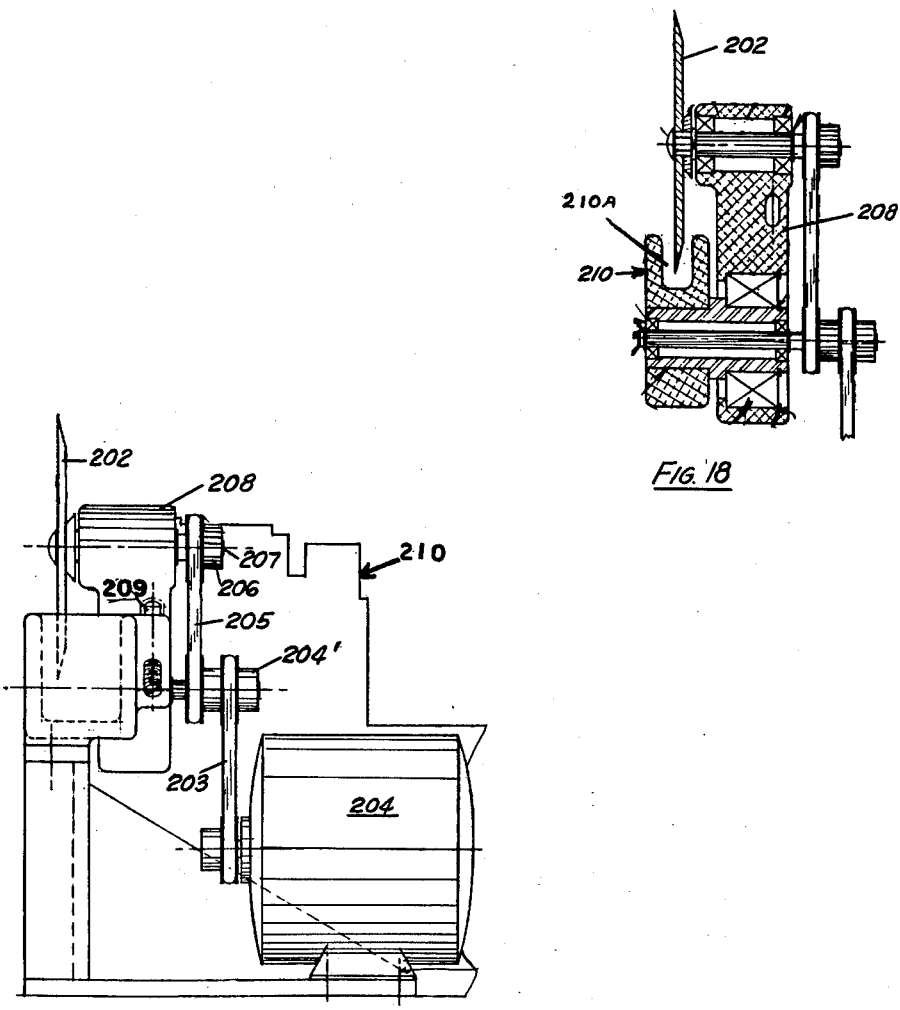

Feb. 12, 1963  C. O. MERCHANT  3,077,095
HORIZONTAL TUBE FLARING MACHINE
Filed April 1, 1957  23 Sheets-Sheet 16

INVENTOR
CHESTER O. MERCHANT
BY:
Charles L. Lovercheck
ATTORNEY

Feb. 12, 1963 C. O. MERCHANT 3,077,095
HORIZONTAL TUBE FLARING MACHINE
Filed April 1, 1957 23 Sheets-Sheet 18

INVENTOR.
CHESTER O. MERCHANT
BY
Charles L. Lovercheck
ATTORNEY

INVENTOR.
CHESTER O. MERCHANT
BY
Charles L. Lovercheck
ATTORNEY

Feb. 12, 1963  C. O. MERCHANT  3,077,095
HORIZONTAL TUBE FLARING MACHINE
Filed April 1, 1957  23 Sheets-Sheet 20

INVENTOR.
CHESTER O. MERCHANT
BY
Charles L. Lovercheck
ATTORNEY

INVENTOR
CHESTER O. MERCHANT
BY:
Charles L. Lovercheck
ATTORNEY

Feb. 12, 1963 C. O. MERCHANT 3,077,095
HORIZONTAL TUBE FLARING MACHINE
Filed April 1, 1957 23 Sheets-Sheet 22

INVENTOR.
CHESTER O. MERCHANT
BY
Charles L. Lovercheck
ATTORNEY

Feb. 12, 1963  C. O. MERCHANT  3,077,095
HORIZONTAL TUBE FLARING MACHINE
Filed April 1, 1957  23 Sheets-Sheet 23

INVENTOR
CHESTER O. MERCHANT
BY:
Charles L. Lovercheck
ATTORNEY

United States Patent Office 3,077,095
Patented Feb. 12, 1963

3,077,095
HORIZONTAL TUBE FLARING MACHINE
Chester O. Merchant, Harborcreek Township, Erie County, Pa., assignor to Swanson-Erie Corporation, Erie, Pa., a corporation of Pennsylvania
Filed Apr. 1, 1957, Ser. No. 649,886
14 Claims. (Cl. 65—177)

This invention relates to forming machines and, more particularly, to tube flaring machines for cutting lengths of glass tubing into short pieces and forming a flare on one end of each length of tubing.

Glass tube handling, cutting, and flaring machines made according to previous designs have usually supported the tubing in a vertical position during the cutting and/or flaring operation. Thus, when heat was applied to the glass during the cutting and/or flaring operation, the heat tended to rise with the convection currents generated. Therefore, a considerable portion of the tubing and, also, the machine parts holding the tubing were heated. This constituted a disadvantage because in order to efficiently form and cut glass, it is of the essence to heat the glass to an optimum temperature and it is also important that the glass be heated only locally.

Further, it has been discovered that it is more difficult to load glass tube handling machines when the tubes are handled in a vertical position and when handling long pieces of tube, it was nearly impossible to handle the tubing beyond a certain length. Machines previously made for handling the tubing in a vertical position were also difficult to maintain. Most of the prior machines used a single flaring tool arrangement which did not balance the forces applied to the glass in the flaring operation and, therefore, resulting in non-symmetrical flares. Prior machines also were so constructed that they generally had to supply heat at the flaring station itself and in these vertical machines, it was almost impossible to use a thermal shock cut-off means for the breaking off of the various lengths of glass. This was partly because the tubing was heated over an appreciable length by convection and, therefore, the glass adjacent the part to be cut had been heated, making it difficult to maintain the proper temperature differential for a thermal shock cut-off.

The present invention contemplates the provision of a flaring machine for glass tubing wherein the glass is handled in a horizontal position and in combination with a thermal shock cut-off. A tube loading hopper, a tubing feed unit, a universal chuck with readily interchangeable jaws, individual motor drives, spindle drives, flaring drives, and index drives are provided. The invention also contemplates an improved construction of index turret and spindle drive. Gas burners are used to supply heat and the size of the holes in the burners are varied from one part of the burner to another so that one end may be made hotter in order to obtain better control of the flaring operation.

It is, accordingly, an object of this invention to provide an improved glass tube cutting and flaring machine and, more particularly, it is an object to provide a glass tubing, cutting, and flaring machine which is simple in construction, economical to manufacture, and simple and efficient in operation.

Another object of the invention is to provide a combination tube cutting and flaring machine in combination with a thermal shock cut-off.

Still another object of the invention is to provide an improved tubing loader in combination with a glass tubing cut-off machine.

A further object of the invention is to provide an improved feed unit for a glass tube flaring machine.

Still a further object of this invention is to provide an improved universal chuck in combination with a tube flaring machine.

Yet another object of this invention is to provide an improved index, turret, and spindle drive for a tube handling machine.

Yet a further object of the invention is to provide an improved tube handling hopper.

Still yet another object of this invention is to provide a machine for cutting and flaring glass tubing wherein the tubing is handled in a horizontal position.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 17 is an enlarged view of the cut-off disk and drive mechanism according to the invention;

FIG. 18 is a cross sectional view of the mechanism shown in FIG. 17 taken through the center of the disk and its shaft;

Components

Figure 1:
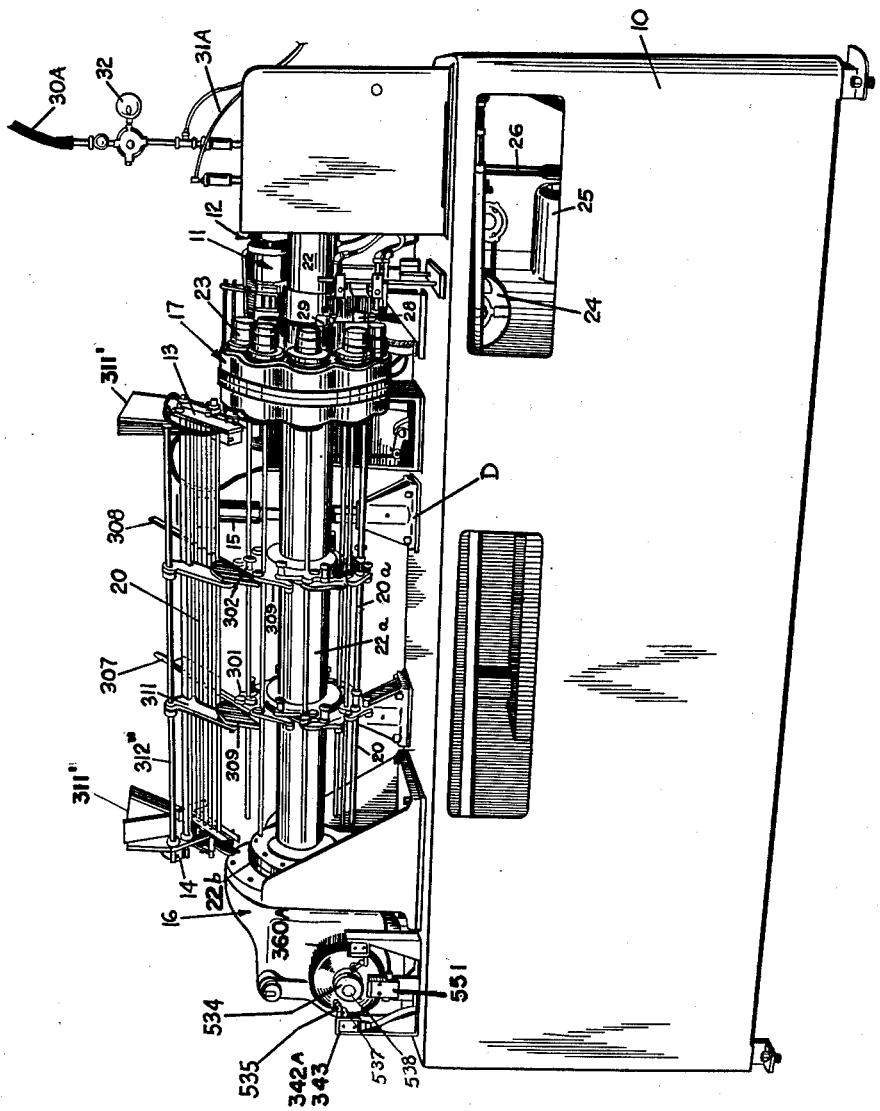
FIG. 1 is an isometric view of an improved tube cutting and flaring machine according to the invention.
Figure 2:
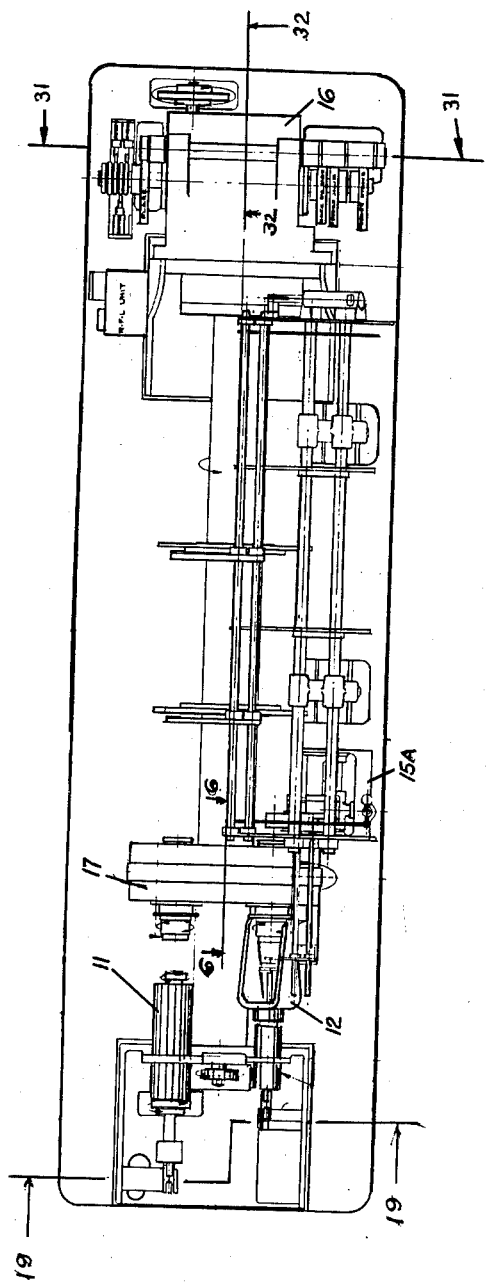
FIG. 2 is a top view of the machine shown in FIG. 1.

The machine which is the subject of this invention is shown in FIG. 1 and is made up of the following major components:

Frame 10
Flaring mechanism 11
Spindle clutch release 12
Glass tube hopper 14
Turret 17
Release mechanism for the hopper 14
Tube advancing mechanism 15A
Indexing device 16
Head 171
Thermal shock cut-off mechanism 210
Glazing device 500

General Organization of Parts

The hopper 14 receives the glass tubes and from it, individual tubes 20 are fed one at a time down into the supports carried by the turret 17. The head 171 is a part of the turret 17 and is supported on a hollow shaft 22 by means of bearings 51. A drive shaft 22a rotates intermittently predetermined amounts to bring each tube 20 carried by chucks 23 in turn into alignment with heating burners 28 and 29 and the flaring mechanism 11 and the tube is advanced one flare length by the mechanism 15A. The finished flared part is broken off by the thermal shock cut-off 210 and the tube length remaining is rotated to the burners 28 and 29 to be heated and to subsequently have another flare formed on the end thereof by the mechanism 11. Indexing the turret 17 to bring each tube length supported thereon to the processing position is carried out by a cross-over cam mechanism carried in the indexing device 16.

The chucks 23 are driven continuously by a motor 24 through a shaft 30 and a gear 33a. A motor 25 drives the flaring mechanism 11 which is constantly rotated through a belt 26 driven by the motor 25. The flaring mechanism 11 is driven at a constant speed and it periodically advances axially to bring its fingers to flare the glass tube 20. The axial movement of the flaring mechanism 11 is caused by a cam 351 on a shaft 80 of the index head and through a lever 352 and a link 357 connected to a lever 380. The burners 28 and 29 are supported in a fixed position on the machine frame 10 and they heat each glass tube 20 in turn as it moves past them. The heat for the burners 28, 29, and 200 may be supplied by a mixture of any suitable combustible gas such as methane or hydrogen. Gas for the burners is supplied through a gas tube 30A and passes through a regulator 32. Oxygen from the tube 31A stimulates combustion and could be used with the gas instead of pure oxygen.

Spindle Head

Figure 6:
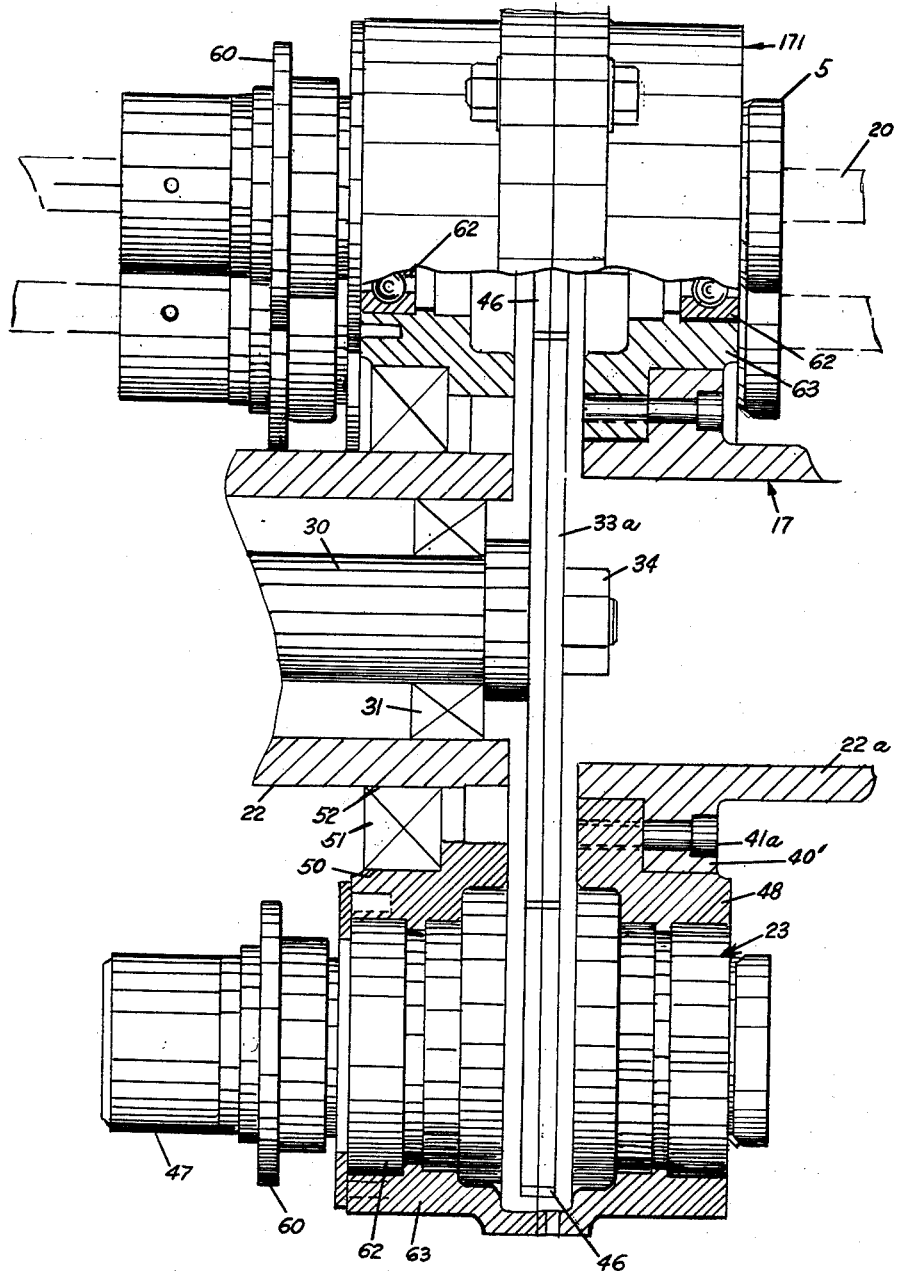
FIG. 6 is a partial cross sectional view taken on line 6—6 of FIG. 2.

FIG. 6 shows a view of the spindle head taken as a longitudinal cross section thereof and shows the hollow cylindrical shaft 22 which is carried in a bearing at 22b in the machine frame 10. The shaft 22a extending longitudinally of the machine is supported in a bearing 612 at the tail or index end 16. The spindle drive shaft 30 is supported in bearings 31 concentric with the shaft 22 and it has the gear 33a attached to one end thereof by means of a nut 34. The shaft 30 has a sprocket 36 attached to the other end thereof by means of a nut 37. The sprocket 36 is driven by a chain 38 which is in turn driven by a sprocket 39 supported on a shaft 40 of a gear reducer 41 and the gear reducer 41 is in turn driven by the motor 24 through a belt 42 which is disposed on V-pulleys 44 and 45, respectively.

Figure 7:
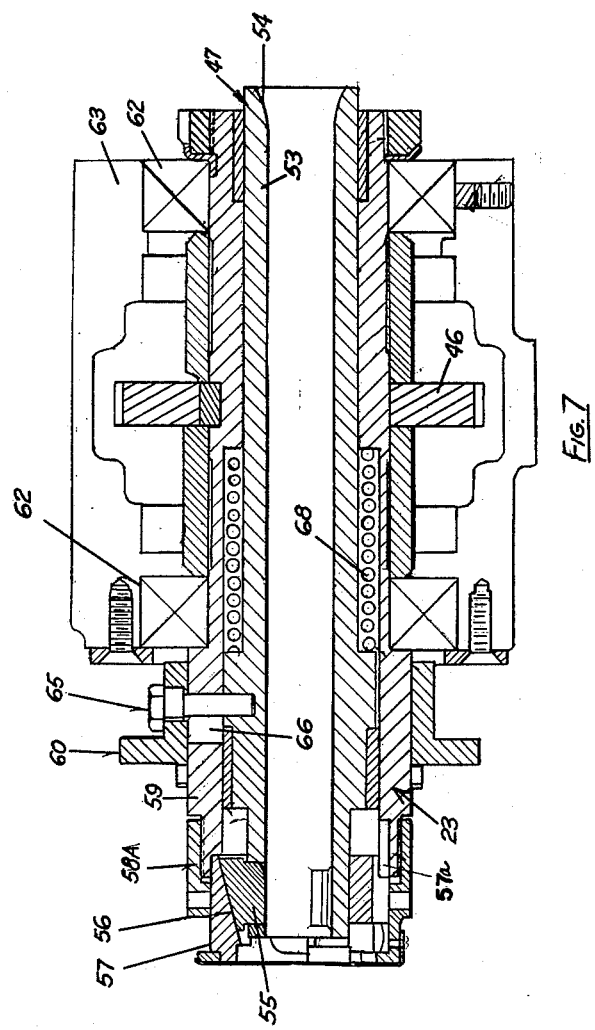
FIG. 7 is a cross sectional view of one of the spindles of the machine.

The gear 33a meshes with planetary gears 46 which are keyed to hollow spindles 47 shown in detail in FIGS. 6 and 7. The spindles 47 are supported in housings 48 of the head 171 which have a lower extension on a flange and the extension is attached to a flange 40' on the shaft 22a by means of bolts 41a. A housing 63 is counterbored at 50 to receive the bearing 51 which concentrically engages the shaft 22 at 52 to support the shaft 22a through the head 171.

Chucks

The chucks 23 are shown in detail in FIG. 7 and have inner tubes 53 which are hollow and the end thereof next to the glass tube hopper 14 is tapered at 54 to slidingly receive the ends of glass tubes from the hopper 14. Circumferentially spaced, radially disposed blades 55 are urged inwardly by a collar 57 having an inner peripheral tapered surface. A spring 68 urges the inner tube 53 to slide telescopically in a sleeve 59 from the position shown urging the blades 55 against the inner tapered surface of the collar 57 and, therefore, urges the blades 55 toward the centers of the chucks 23 to engage the tube 53 at the distal end thereof to clamp it and cause it to rotate with the chucks 23. The blades 55 have a tapered outer periphery which engages the inner periphery 56 of the collar 57 and the collar 57 is held against axial movement with the sleeve 59. The tube 53 is moved axially by a collar 60. A pin 57a fits into a slot in the collar 57 and a complementary slot 66 in the sleeve 59 to hold the collar 57 and the sleeve 59 against relative rotation.

A sleeve 58A is attached to the collar 57 and the sleeves 58A and 59 and the collar 57 are attached together. The outer sleeve 59 is concentrically disposed on the tube 53 and bearings 62 engage the outer periphery thereof and are supported at the outside thereof in a housing 63. The collar 60 slidingly engages the outer periphery of the sleeve 59 and a bolt 65 is fixed to the collar 60 and extends through a slot 66 in the sleeve 59. The inner end of the bolt 65 is attached to the tube 53 whereby the collar 60 and the tube 53 are locked together and move together. Therefore, when the collar 60 is pushed to the right; that is, toward the tail end of the machine to the position shown, the inner tube 53 slides inside the sleeve 59, compressing the spring 68. Since the collar 57 is attached to the sleeve 59, it does not move and the blades 55 move to the right and are released. This is done during operation of the machine by the release mechanism shown in enlarged detail in FIG. 9 wherein rollers 75 engage the collar 60 when a cam 99 acting through a crank 84 and a link 83 swings a crank 79 and slides a hollow shaft 72 in a support 70 to push the tube 53 axially in the sleeve 59. The gear 46 which is attached to the outer sleeve 59 rotates the spindles 47 at constant speed driven by the motor 24 through the shaft 30 and the gear 33a.

Chuck Release Mechanism

Figure 8:
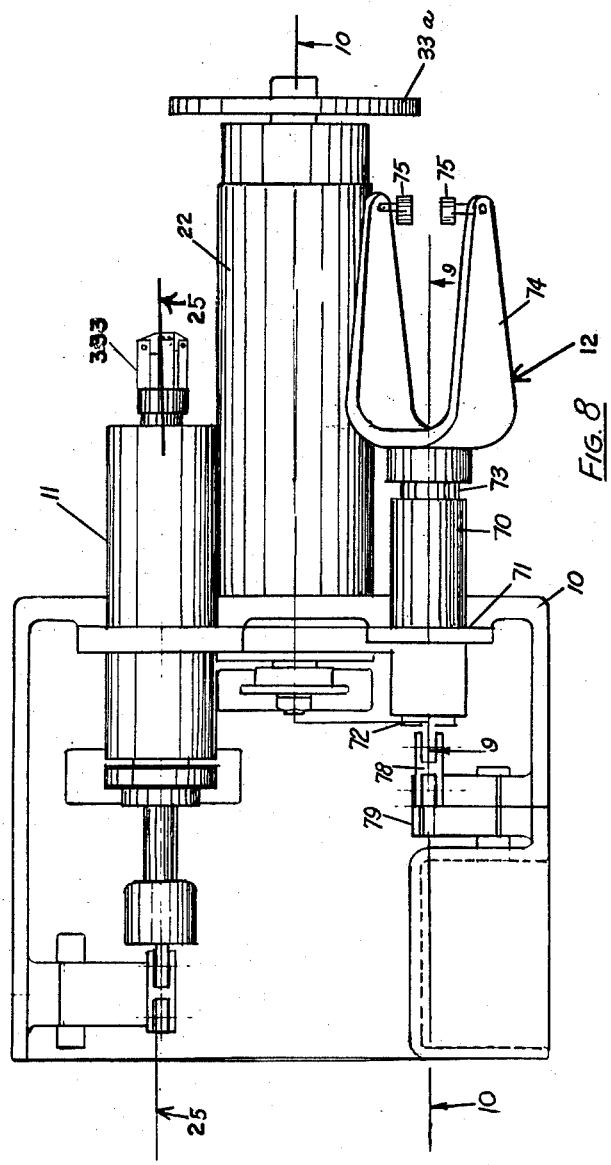
FIG. 8 is an enlarged top view of the spindle release mechanism according to the invention.
Figure 9:
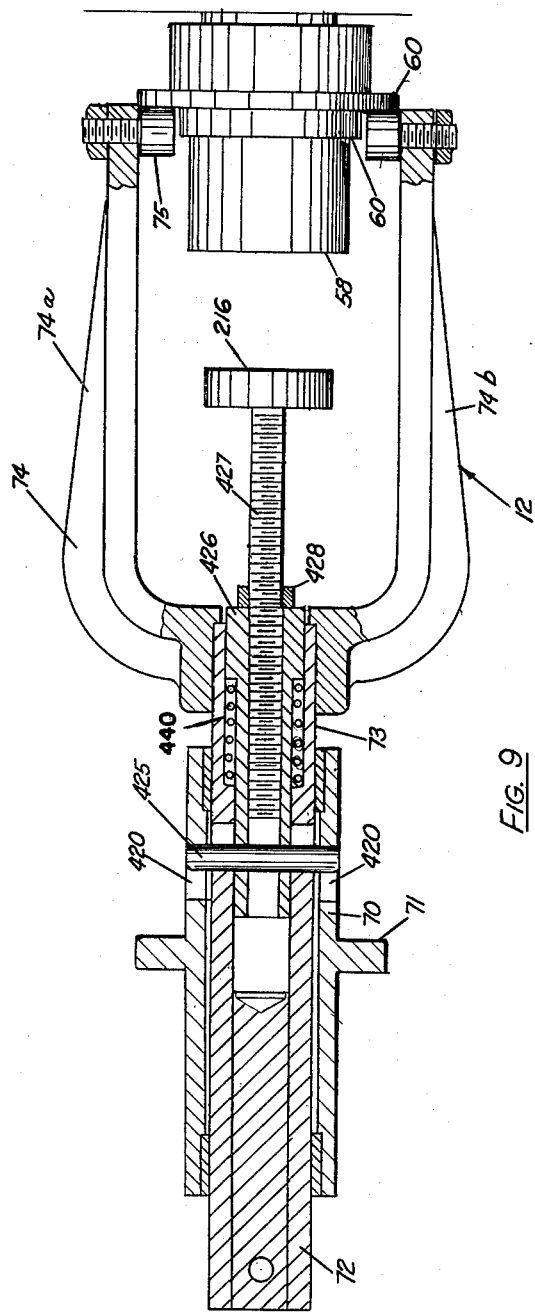
FIG. 9 is a cross sectional view taken on line 9—9 of FIG. 8.
Figure 10:
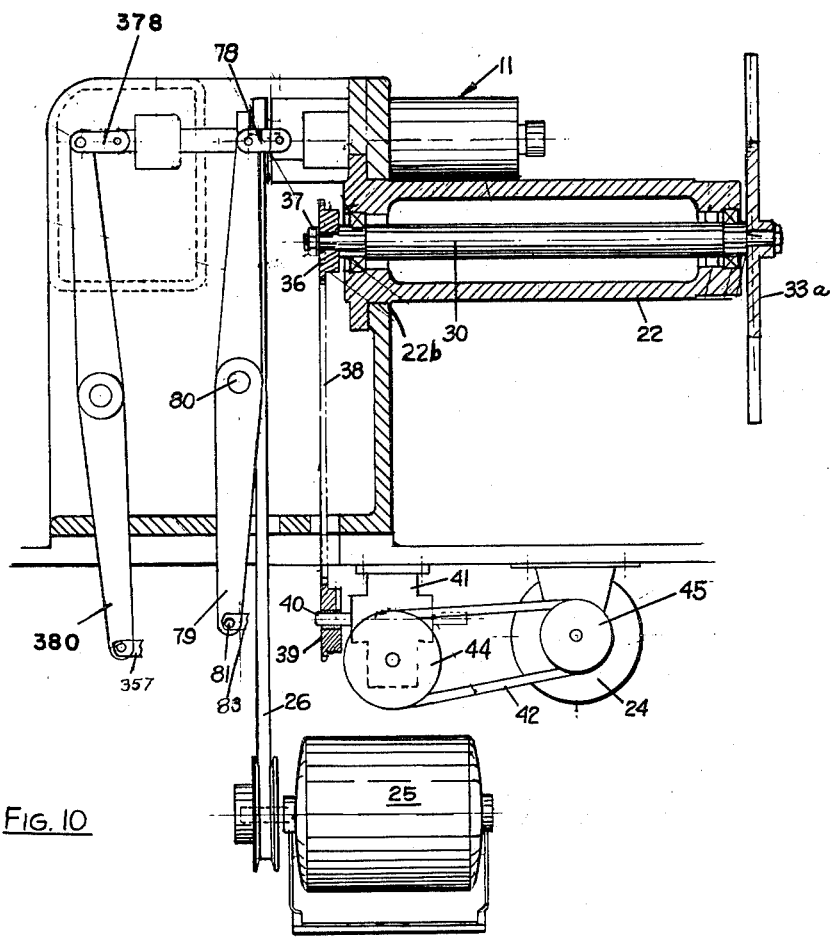
FIG. 10 is a cross sectional view taken on line 10—10 of FIG. 8.

The chuck release mechanism 12 is shown in detail in FIGS. 8 and 9 and is made up of the bearing support 70 which is fixed to the machine frame 10 by means of a flange 71. The support 70 is hollow and has the hollow shaft 72 slidable therein. The shaft 72 extends from the support 70 at 73 and has a bifurcated spindle engaging member 74 having legs 74a and 74b attached thereto. The bifurcated member legs 74a and 74b have the rollers 75 supported on the distal ends thereof. The rollers 75 engage the collars 60 of each of the chucks 23 in turn as the chucks 23 pause between indexes at the tube advance station. Therefore, as the cam 99 on the tail stock rotates at constant speed, it swings the crank 84 which exerts a force on the link 83. This rocks the crank 79 which pushes the shaft 72 to the right to the position shown. As the shaft 72 moves to the position shown, the rollers 75 will push the flanged collar 60 to the right, sliding the bolt 65 of the spindle engaged in the slot 66 to the position shown, therefore pushing the inner tube 53 to the right to release from the blades 55 the tapered collar 57, thereby releasing the glass tube.

The shaft 72 is connected through a link 78 to the crank 79 in FIG. 8 and the crank 79 is pivoted to the machine frame 10. The lower end of the crank 79 is attached at 81 to the link 83 which extends from the tail end of the machine to the head end and is attached to the chuck release crank 84 at 85. The crank 84 is supported on the machine frame 10 on an axle 86 which is attached to the machine frame 10 at 87 and the chuck release crank 84 is swingable thereon at 88 and is swung thereabout by the cam 99 which is driven on a shaft 90.

A slot 420 is formed on opposite sides of the support 70. A pin 425 is attached to an insert 426 and limits the length of stroke that the bifurcated member 74 can take. The hollow shaft 72 has the insert 426 slidable therein which has a threaded member 427 threadably engaging it with a lock nut 428 thereon and a stop 216 on the end thereof. A spring 440 urges the insert 426 toward the rollers 75. Therefore, the ends of the glass tubes which slide through tubes 58 will engage the stop 216. The stop 216 can be adjusted in or out by the threaded member 427 and held in position by the lock nut 428 so that the desired length of tube can be disposed between the end of the tube 58 and the stop 216. The cranks 84, 92, and 93 are all swingable on the common fixed axle 86 and are actuated by the cams 99, 95, and 96, respectively. The cams 99, 95, and 96 are all fixed to and driven at constant speed by the shaft 90 which rotates one revolution each time the turret 17 indexes. The turret 17 is driven by the cross-over cam index mechanism of the machine. When the collar 60 releases one of the chucks 23, the tube advance mechanism will then advance tubing in a manner to be described.

*Glass Tube Clamping and Advanced Mechanism*

Figure 11:
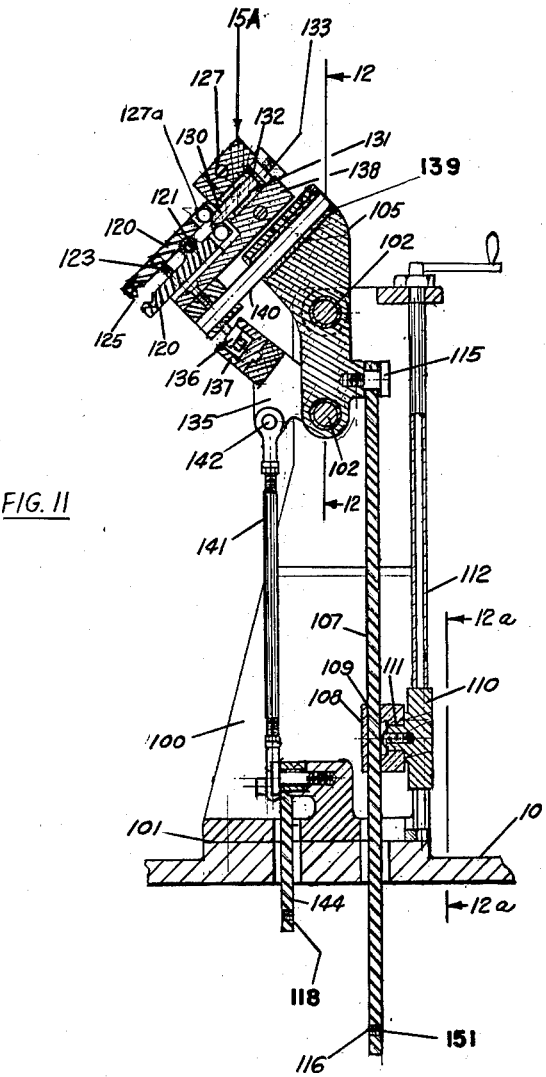
FIG. 11 is a cross sectional view of the tube advance mechanism of the machine taken on line 11—11 of FIG. 12.
Figure 12:
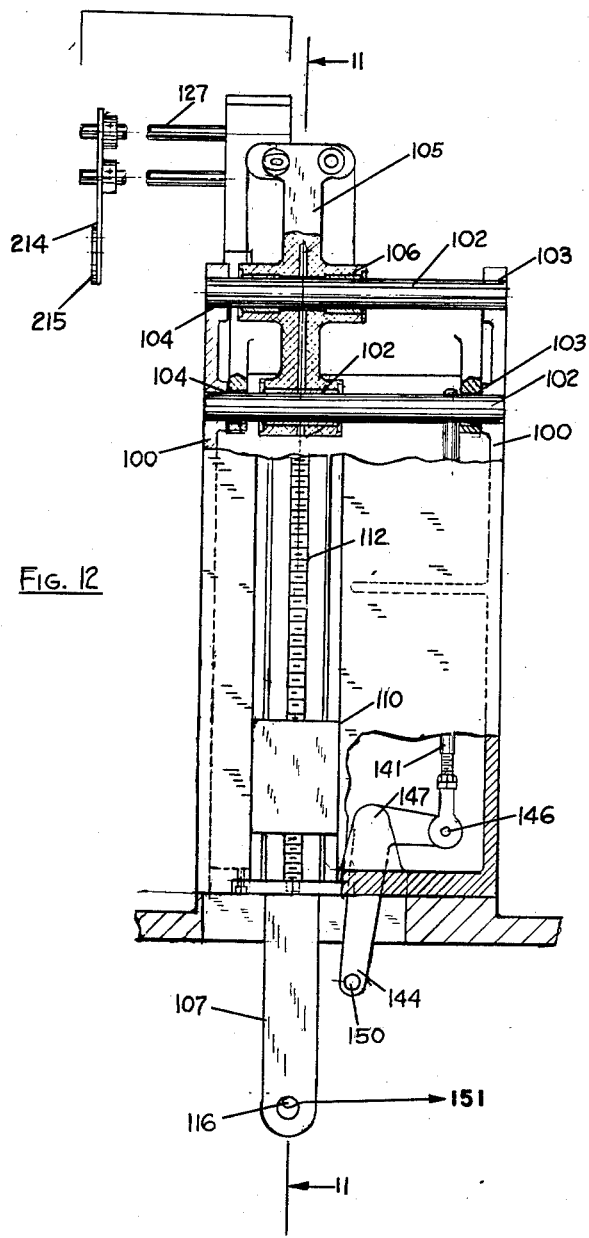
FIG. 12 is a side view partly in cross section of the advance mechanism, the upper part of the section being taken on line 12—12 of FIG. 11 and the lower part of the section being taken on line 12a—12a of FIG. 11.

The glass tube clamping and advancing mechanism is shown in FIGS. 11 and 12 and is generally supported on the machine frame 10 by means of a fixed bracket 100 which is supported on the machine frame 10 at 101. Rod tracks 102 are disposed parallel to each other and fixed to the brackets 100 at 103 and 104, respectively. A carriage 105 has bores 106 therein which slidably engage the tracks 102 and allow the carriage 105 to slide laterally on the rod tracks 102. The carriage 105 is slid laterally by a crank arm 107 which is pivoted to the fixed frame by means of a movable pivot 108 which slidingly receives the arm 107 at 109 and is pivotally connected to a bracket 110 at 111. The bracket 110 has a threaded bore therein which threadably engages a threaded shaft 112 to slide the sliding pivot 108 up and down on the crank arm 107, thereby allowing adjustment of the fulcrum point of the arm 107 to vary the amount the glass tubes are advanced each index.

The upper end of the crank arm 107 is pivoted to the carriage 105 by means of a screw 115. The lower end of the crank arm 107 is attached at 116 to a link 151 which extends to the tail end of the machine and is attached at 152 to the lower end of the crank 93 which has previously been mentioned. Therefore, when the cam 96 rotates, it will swing the crank 93, thereby moving the link 151 to swing the crank arm 107 about the pivot 11 and sliding the carriage 105 longitudinally on the rods 102.

Figure 24:
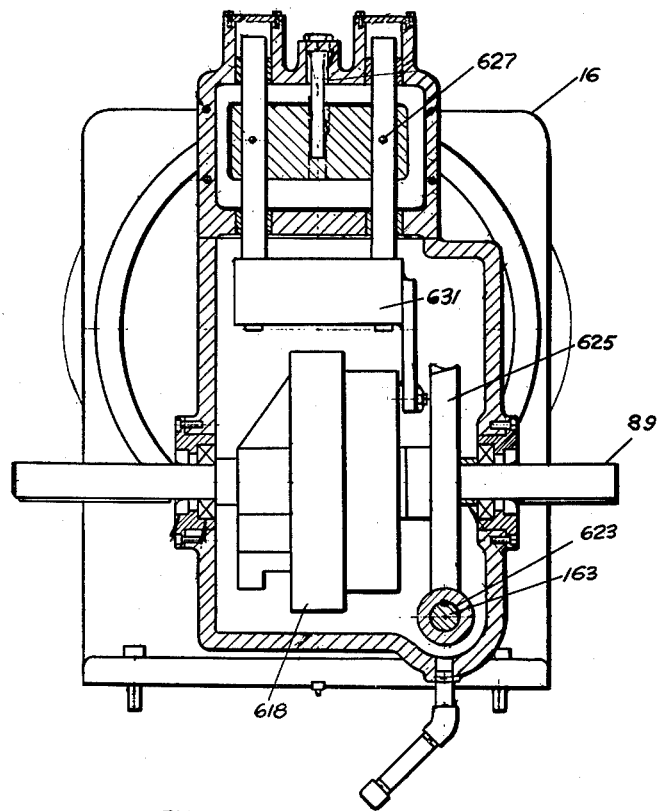
FIG. 24 is a cross sectional view taken on line 31—31 of FIG. 2.
Figure 25:
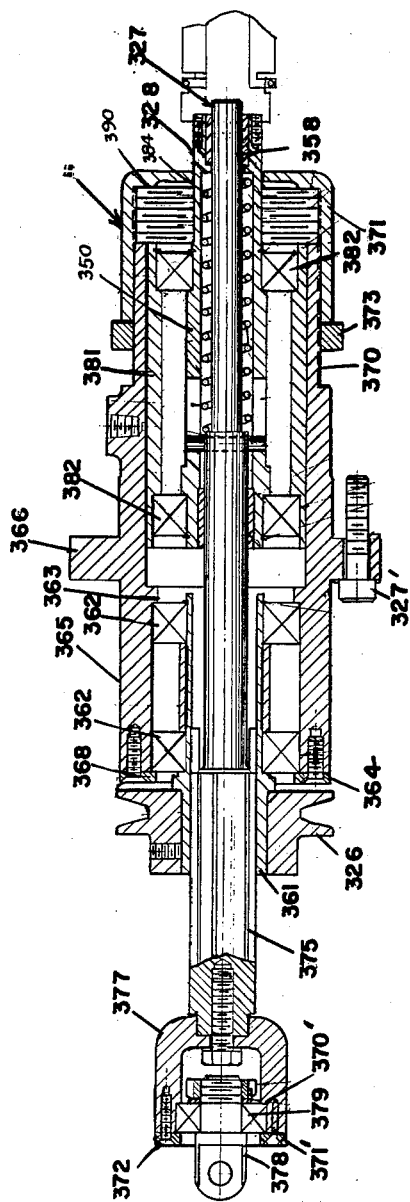
FIG. 25 is a longitudinal cross sectional view of the operating mechanism for the flaring tool taken on line 25—25 of FIG. 8.
Figure 26:
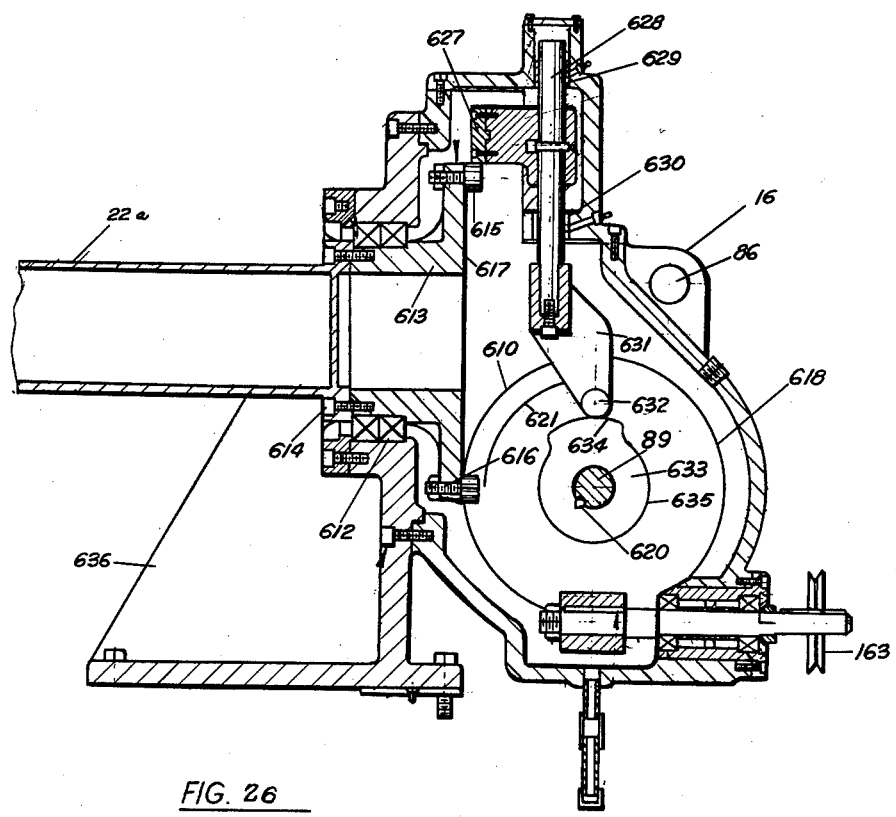
FIG. 26 is a longitudinal cross sectional view taken on line 32—32 of FIG. 2.

Clamping jaws 120 are swingably supported on the carriage 105 by a pivot 121 and are urged apart by a spring 123. The jaws 120 have resilient tube engaging surfaces 125 at their distal ends and at their inner ends, they have ball bearings 127a which are engaged by a point 130 of a piston rod 131. The piston rod 131 is attached to a piston 132 and the piston 132 is slidable in a cylinder 133 which is supplied air from a compressed air source controlled by a cam actuated valve 551 (FIG. 24). The valve 551 is supplied air by a line 557 and is actuated by a cam 539 which is fixed to a shaft 89 and is timed with the cam surface assembly, thereby determining the time in which the valve 551 opens and, therefore, the time in which the jaws 120 open.

The jaws 120 are forced together by the piston rod 131 when it is urged by air against the piston 132 and they are constantly urged apart by the compression spring 123. When the jaws 120 have been urged apart, they are moved out of engagement with the tube and swung away therefrom by a bell crank 135 which is pivoted to the carriage 105 on the lower track 102 and has a universal connection to the jaw carrier by means of a roller 136 which is disposed between the jaws of a bifurcated member 137 on the bell crank 135.

A jaw holder 138 is slidably supported on the carriage 105 by means of a pin 140 which is in turn fixed to the jaw holder 138 and which is slidably received in a bore 139. A link 141 is attached to the bell crank 135 at 142 and the lower end thereof is attached to a bell crank 144 at 146 and to the machine frame 10 at 147. The lower end of the bell crank 144 is attached to a link 118 at 150 and the other end of the link 118 is attached to the crank 92 at 119. Therefore, as the shaft 89 rotates, carrying with it the cam 95, the crank 92 will be swung about the axle 86 on the machine and will apply a tensile force on the link 118 which will swing the bell crank 144 about its pivot 147, thereby causing the pin 140 to slide in the bore 139 in the carriage 105 up out of engagement with the tube. At this point, the carriage 105 will be moved along the rod tracks 102 by the link 151 actuated by the cam 96 to advance the jaws 120 for a new bite on the glass tube. This is all carried out by the cranks, bell cranks, and links as indicated driven by the cams 99, 95, and 96 which are synchronized in accordance with FIG. 23.

Rods 127 are attached to secondary feeding fork 214 and the secondary feeding fork 214 has a notch 215 which slides over the glass tube and engages the tube just behind the flare before the flare is broken off when the glass tube is slid out of the chucks 23. In order to feed the last part of a glass tube completely through after its end passes the jaws 120, the notch 215 will engage the tube behind the flare before it is cut off at the next station and pull the tube on through the chuck 23. The end of the tube will engage the stop 216.

*Indexing Mechanism*

The indexing mechanism 16 is shown in FIGS. 30 and 31 and it intermittently rotates the turret 17 through the drive shaft 22a. The shaft 22a has a flanged member 613 attached to the tail end thereof by means of bolts 614. Rollers 615 are attached to a flat face 617 of the flange of the member 613 adjacent the periphery at spaced points thereon by bolts 616. A cross-over cam wheel 618 is attached to the shaft 89 and is fixed to rotate therewith by means of a key 620. The cam wheel 618 has a peripheral spiral groove 621 on the surface thereof which receives the roller 615 and causes the shaft 22a to rotate a predetermined angular amount; that is, an amount equal to the spacing of the chucks 23 on the spindle head, for each complete rotation of the shaft 89. A sprocket 623 is driven at a constant rate by a motor 33 through a belt 160. The sprocket 623 is keyed to the shaft driven by a pulley 163 and a gear 625 is keyed to the shaft 89.

In order to make certain that the shaft 22 is held positively in position and that the spindle head does not move during the time that the flaring operation is taking place, a locking mechanism is provided on the head end of the machine. This mechanism is made up of a wedge member 627 which is adapted to slide down between two of the spaced rollers 615 at the time that the shaft 22a is in position to align the glass tubes held in the chucks 23 with the operating elements on the head end of the machine. The wedge member 627 is carried by a vertical shaft 628 which slides upwardly and downwardly in bearings 629 and 630. The shaft 628 has its lower end attached to a bracket 631 which carries a roller follower 632. The follower 632 rides on peripheral surfaces 634 and 635 of a cam 633 which is in turn attached to and rotates with the shaft 89.

When the cam 633 is in the position shown, therefore, the high part 634 thereof has moved the wedge member 627 upwardly out of engagement with the roller 615 so that the shaft 22a is free to rotate. Then as the cam 633 continues to rotate, the follower 632 will ride down onto the surface 635 of the cam 633 and the wedge member 627 will therefore be moved down between the rollers 615 and lock the shaft 22a in stopped position. During the stopped position of the shaft 22a, the rollers 615 will be moving along the outside edge of the cam wheel 618. Therefore, the shaft 22a will stand still. The drive mechanism is supported on the main machine frame 10 by an integral bracket 636.

Heating and Flare Mechanism

The burners 28, 28a, and 29 are supported at three spaced points which are all supplied gas from the gas supply source 30A through pipes 180a, 181a, and 181b and they have the tips thereof inclined at an angle to cause a flame to converge on a tube supported in the chucks 23 so that as the chucks 23 are indexed to the position adjacent the burners 28 and 29, the ends of the glass tubes held therein are heated. Then as the chucks 23 are indexed once more, the tube held in the particular chuck is brought into alignment with the flaring mechanism 11 which is shown in particular detail in FIGS. 13, 14, 15, and 16.

Thermal Shock Cut-Off

When the flare is formed on each tube by the flare mechanism 11, the tubes are carried by the turret 17 into the heating position prior to cut-off. A narrow peripheral portion of the tube is heated by the burners 200 while the tube is in the position shown for the chuck 201. When heated, the tube is rotated past a disk 202 which is rotated by a belt 203 on a motor 204. The disk and cut-off means are shown in detail in FIGS. 17 and 18 which show the belt 203 driving an idler 204' which in turn drives a belt 205 which drives a pulley 206 which is fixed to a shaft 207 in turn journalled in a swinging arm 208. The swinging arm 208 is spring urged to the upper position by a spring 209 and as the glass tube to be cut rolls by, it engages the disk 202 and the disk 202 is pushed out of the way by the tube as the tube goes by. At the same time, however, because of the cold water on the disk 202, the water being contained in a tank 210A induces a thermal shock in the glass tube and, therefore, breaks off the flared end of glass tube smoothly at the heated portion. If the burners 200 are properly adjusted to heat the glass near the optimum temperature, the glass tube will break clean at the desired point.

Flaring Mechanism

The flaring mechanism 11 is shown in FIGS. 13 to 16 and 25. The flaring mechanism 11 is driven by the motor 25 through the belt 26 which is connected with a pulley 326. The pulley 326 is attached to a sleeve 361. The sleeve 361 rotates in anti-friction bearings 362 which are fixed between a shoulder 363 and a ring 364 in a housing 365. Screws 368 clamp the ring 364 in place. The housing 365 has a flange 366 integral therewith which is fixed to the machine frame 10 by bolts 327'. The housing 365 has external threads 370 on the inner end thereof which mate with internal threads inside an end cover 371. A lock nut 373 also engages the threads 370 and can be tightened to hold the cover 371 in any predetermined position.

A shaft 327 has a spline section 375 attached to links 377. The link 377 is cup shaped and has a clevis member 378 rotatably attached to the tube by means of an anti-friction bearing 379 which is held in a counterbore 370' by the cover 371 held in place by screws 372 so that the member 378 is attached to the upper end of the crank 380. The pulley 326 drives the shaft 327 at a moderately high speed. The shaft 327 extends through and is attached to the flaring tool.

A sleeve 381 is slidably supported inside the housing 365 and slidable therein. The sleeve 381 has anti-friction bearings fixed therein and the anti-friction bearings rotatably receive a hollow shaft 350. The hollow shaft 350 is attached to the bell crank mechanism of the flaring tool. A compression spring 384 is supported on the shaft 327 and engages a shoulder 385 thereon at one end and an internal shoulder 386 on the shaft 350 at the outer end. A pin 388 is fixed to the shaft 327 and slidably supported in a slot 389 in the hollow shaft 350.

Therefore, when the shaft 327 is driven under constant speed by the motor 25 and when the cam 351 rotates, it causes the crank 380 to cause the shaft 327 to slide axially in the sleeve 361 and the compression springs 384 will carry the shaft 350 forward with it, causing fingers 347 to enter the end of the glass tube. When the sleeve 381 strikes the inside end of the cover 371 at 390, since it can move no further axially, the compression spring 384 will begin to be compressed and the shaft 327 will move axially inside the shaft 350, therefore swinging bell cranks 336a relative to links 333 and causing the fingers 347 to move to the position shown in FIG. 14. Since these fingers will be rotating with the shaft 327, the flare 360 will be formed on the hot section of the glass tube. As the cam 351 continues to rotate, the shaft 327 will be withdrawn by the crank 380 to the point that the pin 388 will move to the position shown in FIG. 25 and the fingers will move to the position shown in FIG. 15. Then the shaft 327 continues to move and the fingers will be withdrawn from the tube.

The end of the shaft 327 is attached to a bracket 329 which receives the end of the shaft 327 in a counterbore 330' in the end thereof and a bolt 331 is attached to the shaft holding bracket 329 in fixed relation thereto.

The bracket 329 has outwardly extending ends 332 which have U-shaped members 333' swingably attached thereto at 334'. The U-shaped members 333' are pivoted at 335 to the bell cranks 336a. The bell cranks 336a are pivotally connected at an intermediate point 337 thereon to fixed members 338' which are fixed to a bracket 339 by means of screws 340. The U-shaped members 333' have legs 341 and 342 constituting spaced links and an intermediate portion 343'.

Figure 14:
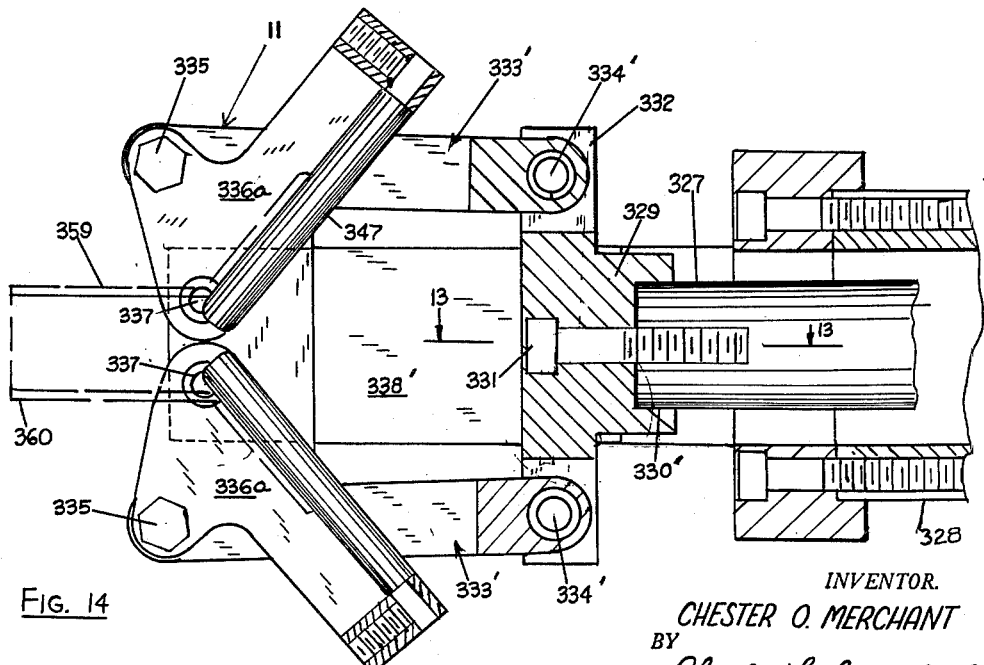
FIG. 14 is a cross sectional view of the flaring mechanism shown in FIG. 13 taken on line 14—14 of FIG. 13.
Figure 15:
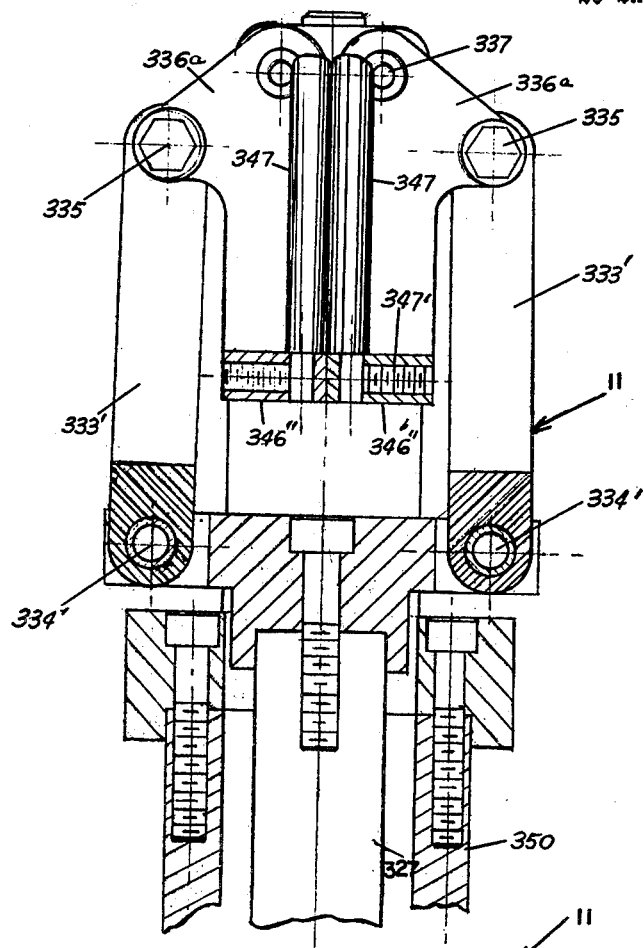
FIG. 15 is a cross sectional view of the flaring mechanism shown in FIGS. 13 and 14 but with the flaring arms withdrawn.
Figure 16:
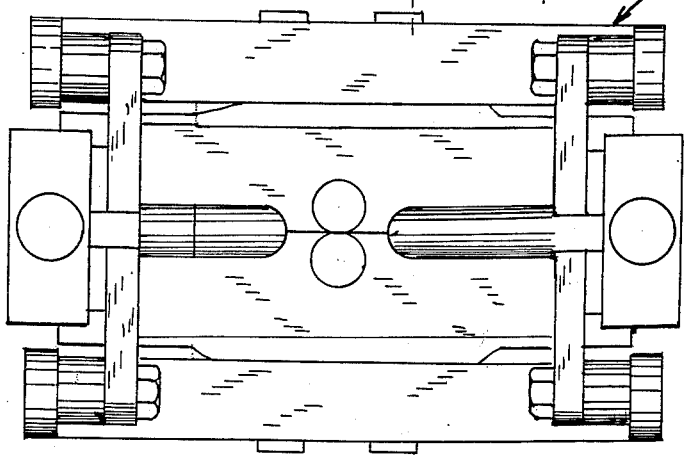
FIG. 16 is a front view of the flaring mechanism shown in FIGS. 13, 14, and 15.
Figure 19:
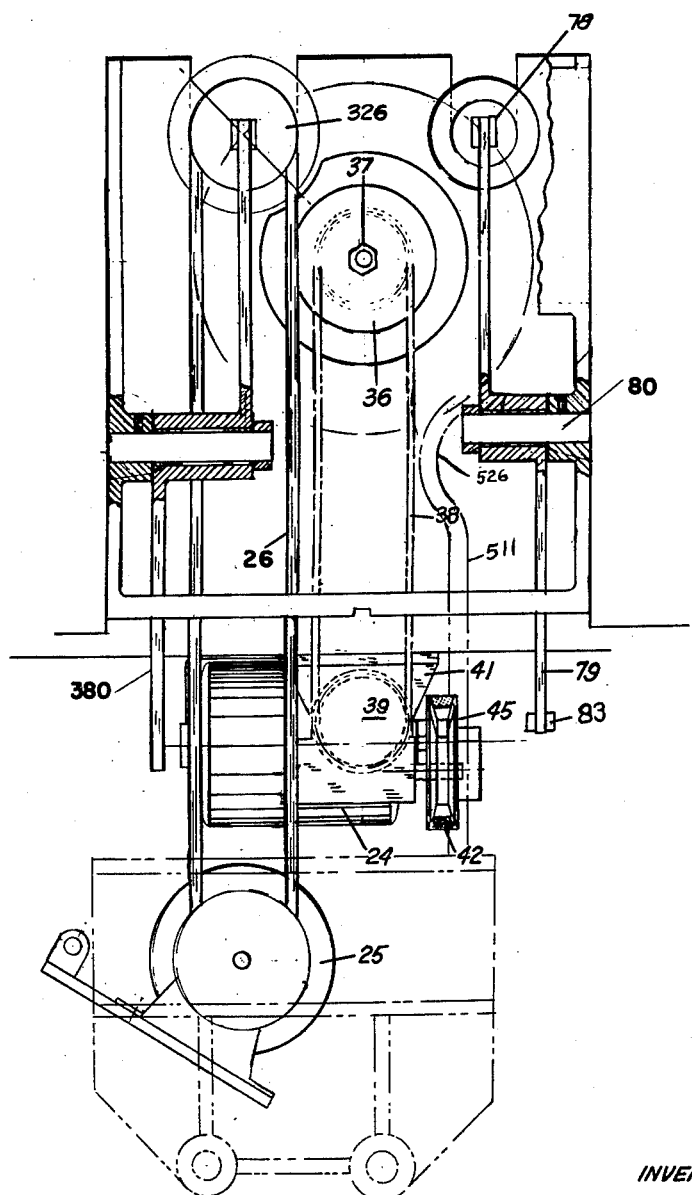
FIG. 19 is a cross sectional view taken on the line 19—19 of FIG. 2.
Figure 20:
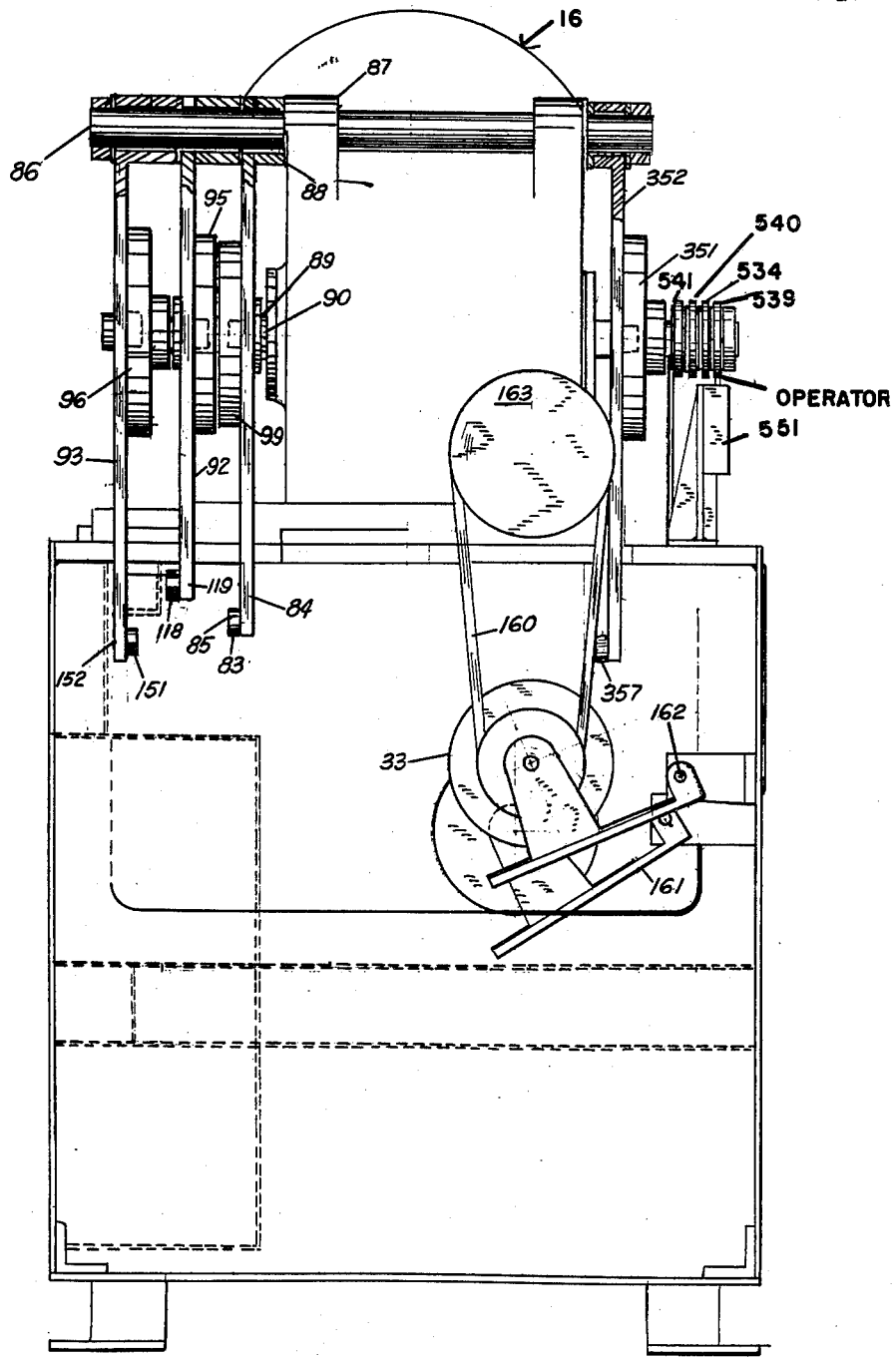
FIG. 20 is an enlarged rear end view of the machine according to the invention.

The bell cranks 336a actually constitute legs of U-shaped members 345 which are disposed in spaced relation and have an intermediate portion 346" to which the fingers 347 are attached. The fingers 347 are cylindrical in cross section and are attached to the intermediate portion 346" of the U-shaped members 345 by means of set screws 347'. When the glass tube to be flared is first advanced, the fingers 347 are in the position shown in FIG. 15. As the flaring tool is advanced by sliding the hollow shaft 350 forward, the flaring fingers 347 enter the end of the tube. The bell cranks 336a swing to the position shown in FIG. 14. As the fingers 347 move outwardly to the position shown in FIG. 14 while the heated tube rotates, a flare will be formed on the end of the tube as shown in FIG. 14. Then the tube will be indexed to a new position by the turret 17 and the tube will be heated locally. Then, upon the next index, the heated portion of the tube will engage the cold disk 202 where it will be broken off at 360.

Hopper

Figure 22:
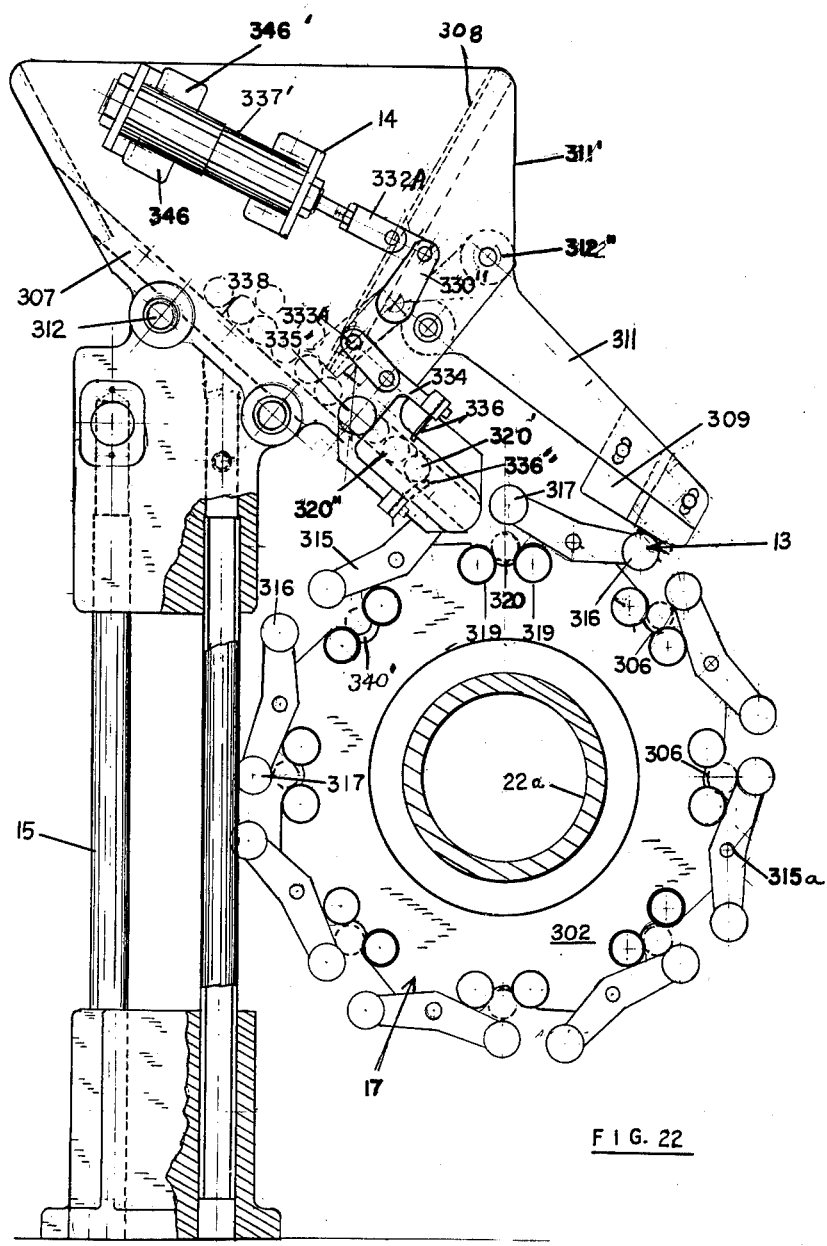
FIG. 22 is a cross sectional view taken on line 22—22 of FIG. 2.

The machine hopper is shown in detail in FIGS. 1 and 22 and it comprises spaced plates 301 and 302 which are attached to the main shaft 22a. The plates 301 and 302 have spaced notches 306 therein which are adapted to receive elongated single lengths of glass tubing. Rollers 319 are attached to the plate 302 at each side of each notch 306. The size of the rollers 319 can be varied to accommodate various sizes of the glass tubing. A supply of glass tubing to be cut and flared is stored on the top of supports 307 and 308. The tubes slide down against stops 336 and 336" which are attached to the arms of link 334 which is pivoted to the frame 10 and actuated by a piston rod 332A. Cams 309 are fixed in the frame 10 on brackets 311 which are in turn carried by rods 312". The rods 312" are carried by end plates 311" which are attached to fixed pedestals 15.

Figure 13:
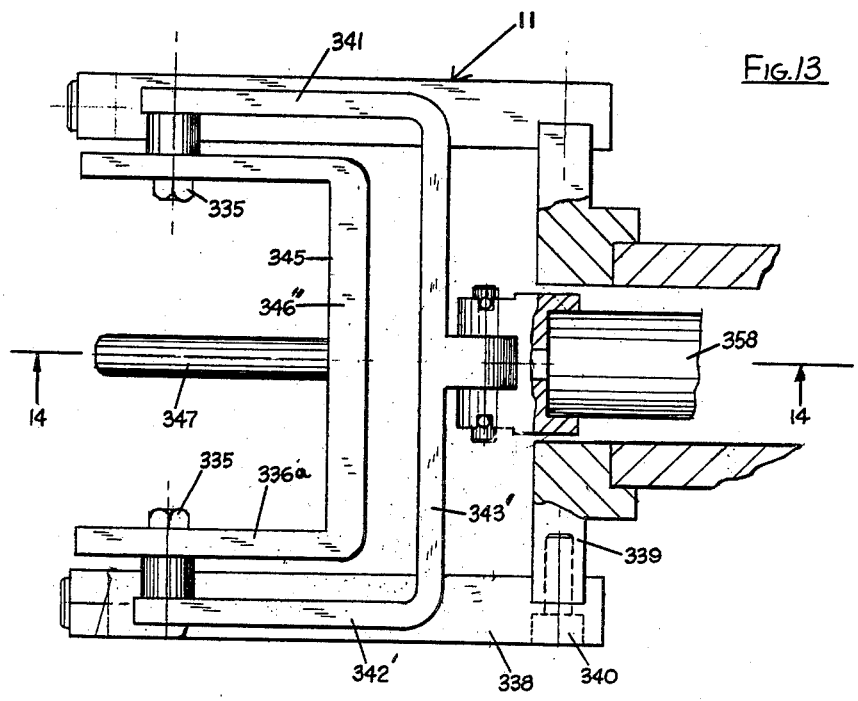
FIG. 13 is a side view of the flaring mechanism of the machine partly in section taken on line 13—13 of FIG. 14.

As the shaft 22a rotates, rollers 316 on rockers 315 in turn engage the cams 309 and rock the rockers 315 about their pivots 315a by which the rockers 315 are attached to the plate 302 and thus lift the end having a roller 317 to allow a glass tube to slide down between the rollers 317 as each particular roller 316 comes to the position shown in FIG. 13. Therefore, each time the pair of rollers 319 on the plate 302 reach the top part of the cycle of rotation, the roller 316 thereof engages the cam 309 and the rocker 315 therefore allows one length of tubing 20 to fall down into engagement between the two rollers 319 thereunder if a tube is released by the stop 336".

Before the tube can fall down into the notch, a crank 332" must be actuated by the piston rod 332A. The lower end of the crank 330" is attached at 333A to the arms of a U-shaped link 334. The link 334 is pivoted to the frame at 335' and has the lower stop member 336" which supports the lower of the glass tubes and holds it in position. When the piston rod 332A is retracted by the air in the cylinder 337', the stop 336" is moved down from out of the front of a lower tube 320' and it can slide down an incline 338 into a notch 320 at the topmost position shown in FIGS. 13 and 22 between the rollers 319. The upper stop 336, being rigidly attached to the link 334, will move down in front of tube 320" and retain it while the tube 320' is descending into the notch 320. When the piston rod 332A extends, it will lift the stops 336 and 336" and the tube 320" will roll down against the stop 336" to the position shown for the tube 320'. When the turret 17 again advances, the rocker 315 shown in engagement with the cam 309 will rock back into position and hold the tube 20 between the rollers 319. The rockers 315 are spring biased by a helical spring wound around pivots 315a. The air cylinder 337' is not actuated unless the tube in the particular notch 306 is used up.

The end plates 311" are adjustable axially on the rods 312" and may be adjusted so that the glass tubes 20 will fit snugly between them but will be located in a position relative to the turret 17.

In order to insure that the first flare formed on the end of each tube 20 is of uniform length, the end plates 311" can be adjusted on the rods 312" so that each tube 20 is accurately located on the turret 17 when it is dropped into the notch 320. Therefore, the first flare which is formed on the end of it when it is advanced through the chuck 23 will be equal in length to each subsequent flare when the end plates 311" are properly adjusted.

*Wiring*

Figure 21:
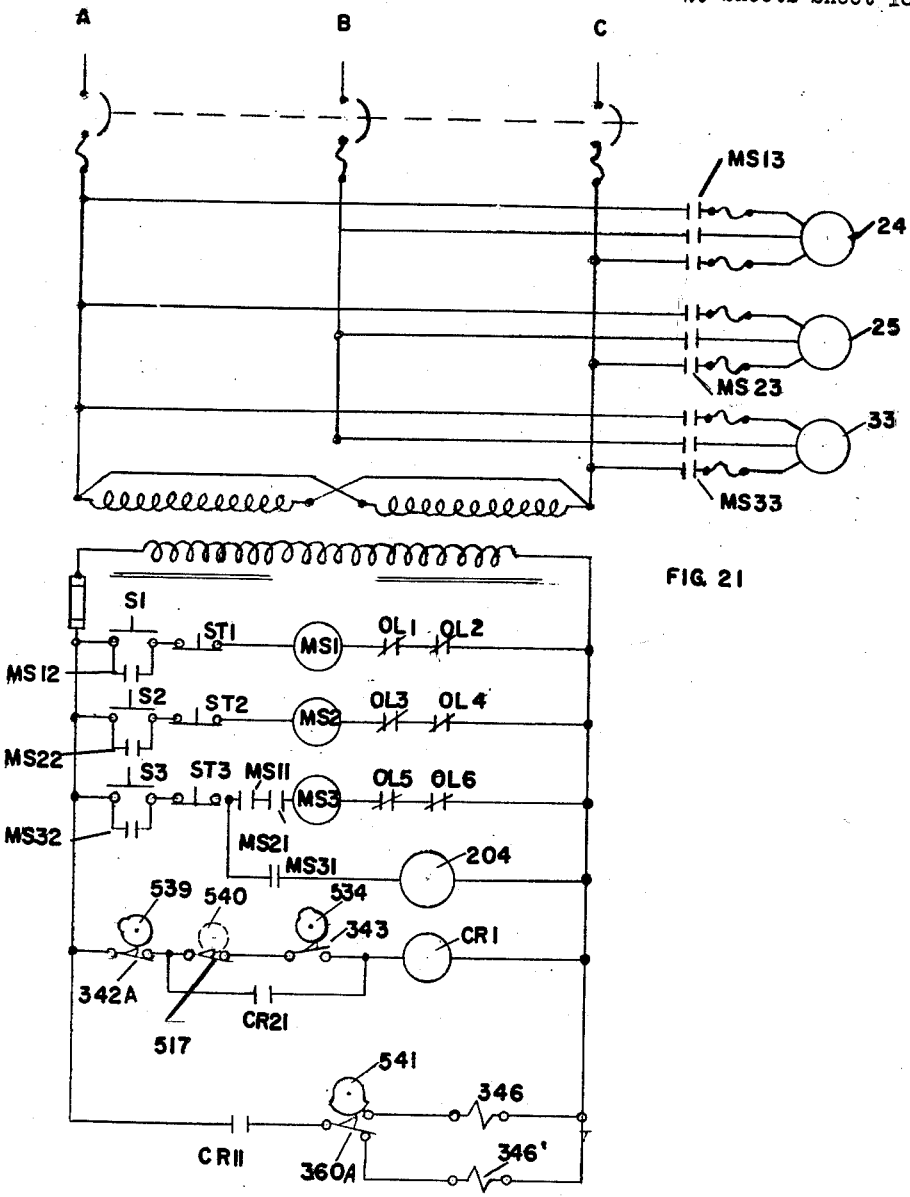
FIG. 21 is a wiring diagram of the machine.

The wiring diagram for the machine shown in FIG. 21, a source of electrical power, is connected to wires A, B, and C of the upper control circuit of a transformer supplying power to the spindles, flaring, and index drive motors 24, 25, and 33, respectively.

MS1, MS2, and MS3 represent solenoids of electromagnet relays having contacts MS11, MS12, and MS13; MS21, MS22, and MS23; and MS31, MS32, and MS33, respectively. The contacts are all normally open contacts and they close when the respective solenoids are excited.

Figure 3:
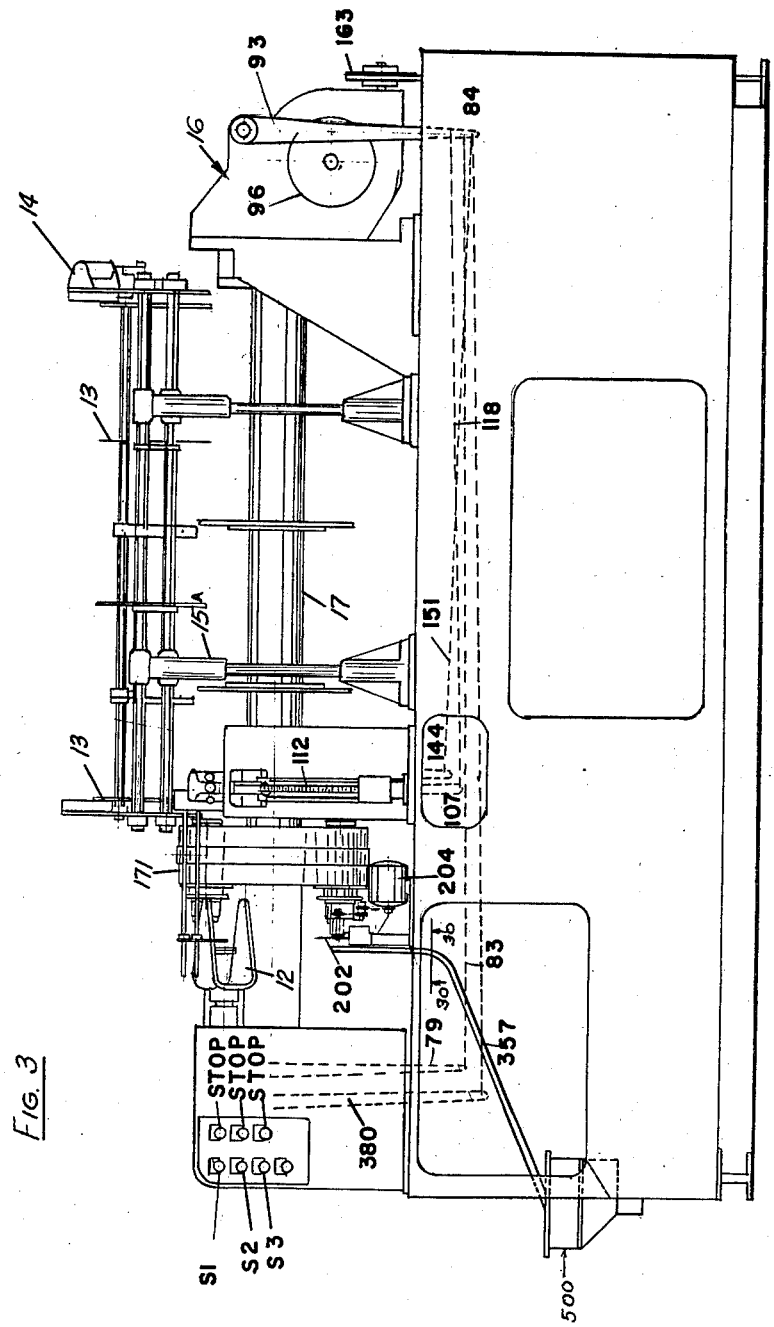
FIG. 3 is a side view of the machine shown in FIG. 1.

Switches S1, S2, and S3 are push button type starting switches shown on the side of the machine in FIG. 3. The contacts MS12, MS22, and MS32, respectively, are connected in parallel and interlock the push button switches when the respective solenoids close and cause the respective solenoids connected thereto to remain magnetized when they have once become magnetized.

Overload switches OL1, OL2, OL3, OL4, OL5, and OL6 are connected as shown in series with the solenoids referred to so that the solenoids will be actuated by current flowing through the overload switches so that when an overload in the circuit occurs, the overload contact will open and thereby deenergize the particular solenoid and, therefore, stop the motor 24, 25, or 33 connected thereto.

The solenoid MS3 is connected in series with the contacts MS11 and MS21 so that it is necessary that the solenoids MS1 and MS2 both be energized, closing normally open contacts MS11 and MS21 before solenoid MS3 can be actuated through its push button switch S3. When the solenoid MS3 is energized, it will close its normally open contact MS31 which will start the cutting wheel motor 204.

Figure 4:
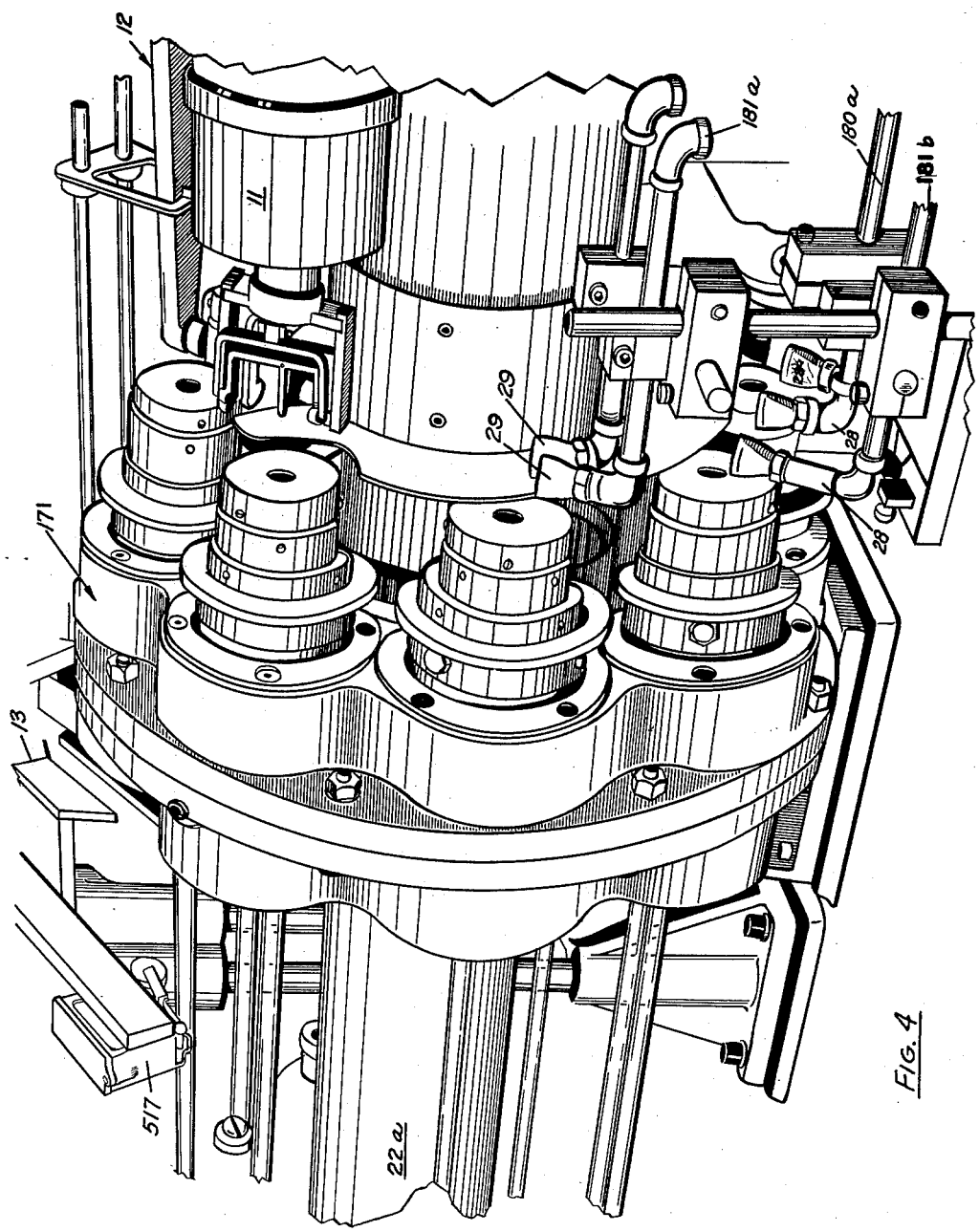
FIG. 4 is an enlarged partial view of the side of the machine wherein the tubes are flared; that is, the side from which the view in FIG. 1 is taken.
Figure 5:
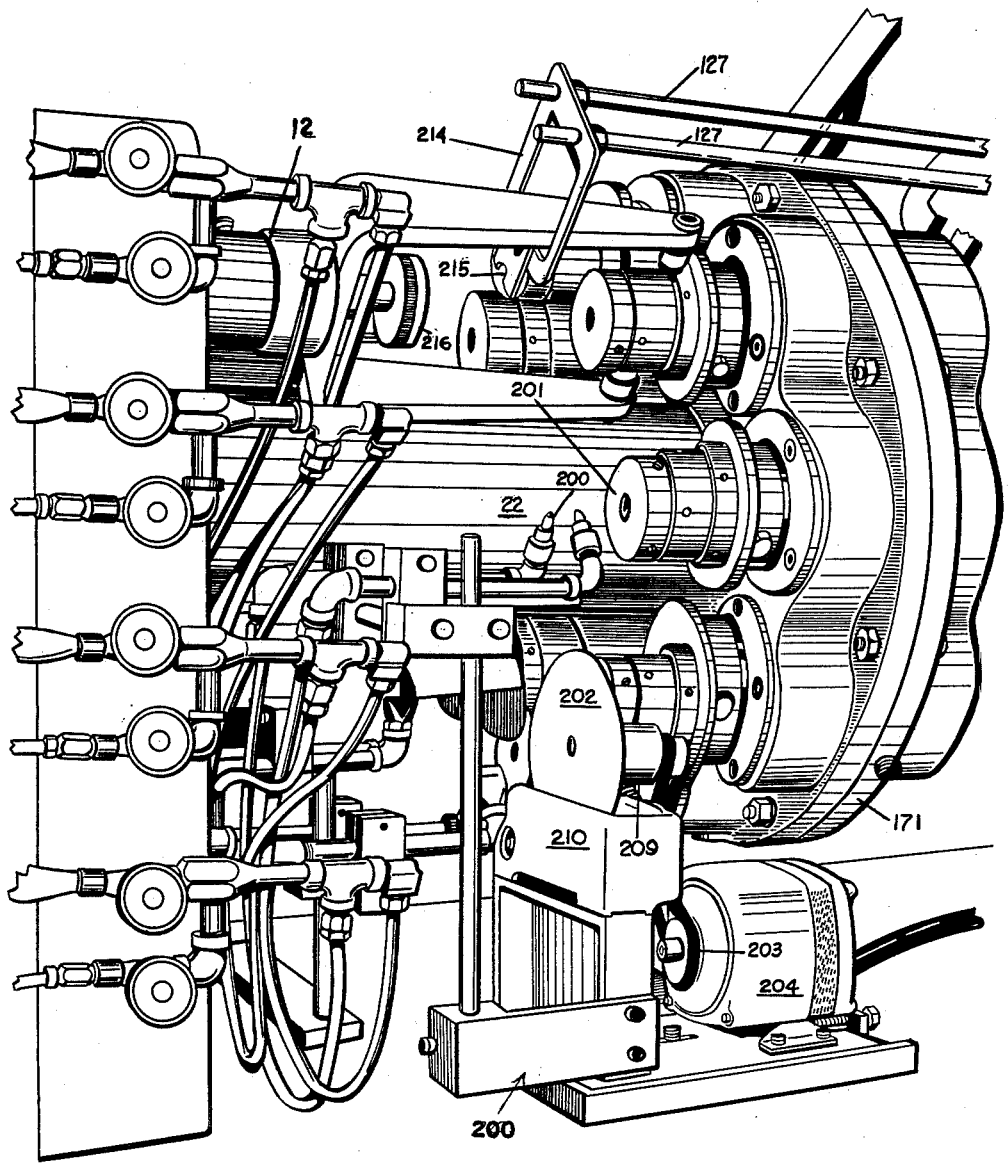
FIG. 5 is a partial view of the side of the machine opposite the side shown in FIGS. 1 and 3.

Solenoid CR1 is connected in series with limit switches 343, 517, and 342A. The switches 343, 517, and 342A are actuated by cams 534, 540, and 539 and are closed when the cams 534, 540, and 539 rotate to a particular position. As soon as the solenoid CR1 is energized, it will close its normally open contact CR11 and thereby energize either the feed solenoid air valve coils 346 or 346', depending upon which position feed control switch 360A is in. The feed control of the switch 360A is operated by the cam 534 on the shaft 89. There are three cam control limit switches: the reset limit switch 342A and feed control switch 360A both mounted on the tail end of the machine and actuated by the cams 534, 540, and 539 and the check control limit switch 343 (FIG. 4). The glass check switch 517 is mounted on the head end of the machine and is held open by glass tubes in the machine when there is a tube in loading position and closed when no tube is in position.

Figure 23:
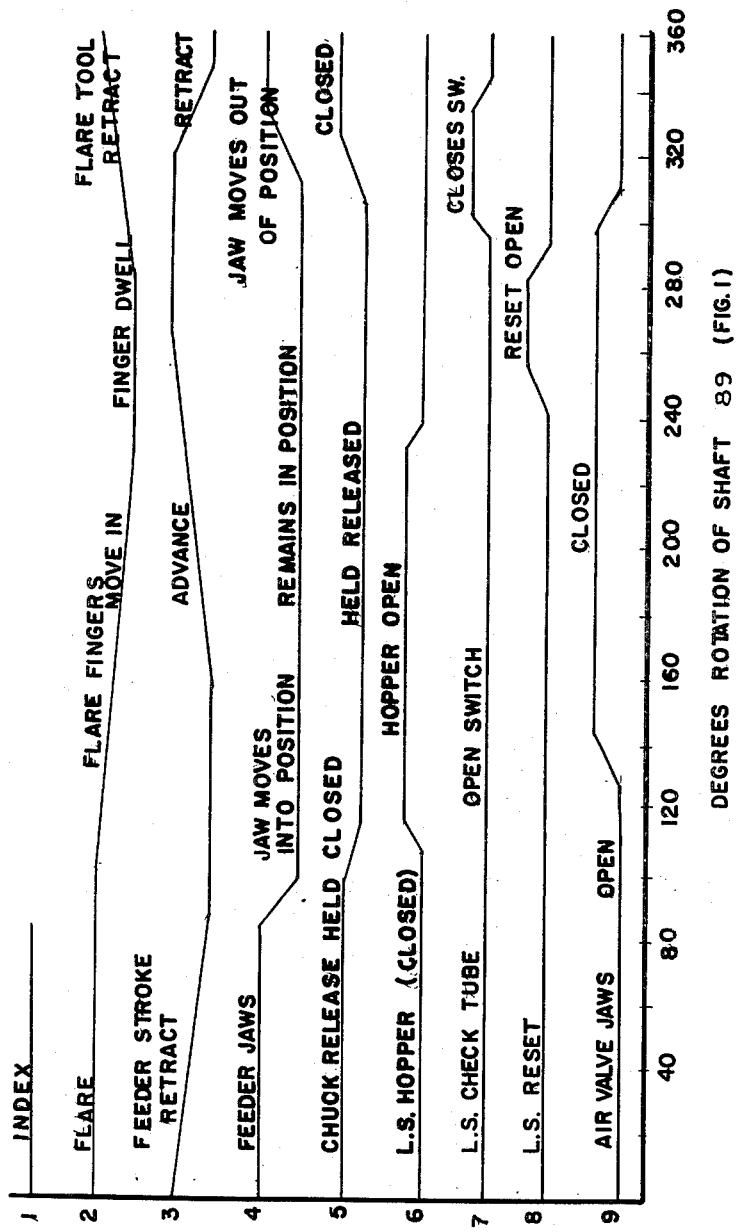
FIG. 23 is a timing diagram of the machine operation.

The operation sequence for the switches 343, 342A, and 360A is shown in FIG. 23 by curves 7, 8, and 6. As the shaft 89 rotates, the reset switch 342A opens and deenergizes solenoid CR1 and the coils 346 and 346'. Then, since it is assumed that no tube 20 is in place, the switch 517 will be closed and cam 534 will rotate to close the switch 343 (curve 7, FIG. 23). This will energize solenoid CR1. The solenoid CR1 will close its contact CR11 and when the cam 541 opens the switch 360A, the valve coil 346' will be energized. The piston rod 332A will move the stops 336 and 336" down, allowing a glass tube to fall into a notch 320. Next, the switch 360A will close to the position shown. This will energize the valve coil 364' and cause the piston rod 332A to retract. The limit switch 343 then closes, energizing the solenoid CR1. Contacts CR11 and CR21 are thereby closed and solenoid CR1 is thus interlockingly closed. As the shaft 89 continues to rotate and the turret carried by the shaft 22a continues to rotate or index as the cam rotates through one hundred to two hundred forty degrees, the feed control limit switch 360A is operated. This energizes the feed solenoid valve coil 346. At two hundred fifty degrees rotation of the shaft 89, the reset limit switch 342A is opened, deenergizing solenoid CR1.

If a tube had been in the notch 320, the glass check switch 517 would remain open so that as the cam 534 rotated from ninety to three hundred sixty degrees, the check control at three hundred to three hundred fifty degrees would not energize the solenoid CR1. Therefore, no tube would be fed and this would continue until the full length of tube had been formed into flares and, therefore, some particular station was empty. The operation of the other stations on the turret would be similar to the operation of the station described.

*Timing of the Machine Elements*

In order for the machine to properly function, the hopper, tube advance, index of the turret, flaring tool, chuck release, and other elements must operate in a definite timed sequence. This is accomplished by the cams on the shaft 89 acting through cranks and links running from the tail end of the machine to cranks attached to the actuated elements.

FIG. 23 shows diagrammatically the time sequence relation of the movement of various parts of the machine. The drive motor 33 drives the shaft 89 at a substantially constant rate of speed. The three hundred sixty degree cycle of the shaft 89 in FIG. 23 represents the time for the shaft 89 to make one complete revolution. Since the cross-over cam wheel 618 rotates with the shaft 89, the turret 17 will be rotated one chuck position for each full rotation of the shaft 89. Curve 1 shows the index or time during the cycle in which the turret 17 moves through an arc equal to the spacing of the notches 306. This index movement of the turret 17 takes place as shown while the cam shaft moves through approximately ninety degrees.

The flare tool 11 is held stationary and in retracted position while rotating about its axis during the index period. When the turret 17 has stopped, a glass tube will be in alignment with the flaring tool 11. The fingers of the tool 11 will move into the tube, expand it, and dwell in the expanded position while rotating to insure a uniform symmetrical flare. Then the flaring tool 11 will retract during the increments of cam rotation indicated in FIG. 23.

The timing of the tube advance mechanism (FIG. 11) relative to the timing of the other machine components is shown in curves 3 and 4. Curve 3 relates to the operation of the crank arm 107 and curve 4 refers to the operation of the bell crank 144. The jaws of the chucks 23 must be released while the carriage 105 of the tube advance mechanism is retracting and the jaws must be closed when the feed is advancing so that the tube will be pushed to a new position while the chuck 23 is released and prior to the time that a flare has been cut from its end. Curve 9 shows the operation of the air valve to the cylinder 133 on the jaws 120. The jaws 120 must grip the glass tube during the time of advance of the carriage 105, curves 3 and 4, in order to advance each tube one flare length while its chuck is released. Curves 6, 7, and 8 indicate the relative times that the limit switches 342A, 343, and 360A are closed during a cycle.

*Operation*

A supply of glass tubes 20 to be processed will first be supported on the hopper 14. Then electrical power will be applied to wires A, B, and C to the motors 24, 25, 33, and 204 by depressing switches S1, S2, and S3. A combustible gas will have been applied to the tube 30A and oxygen may be applied to the tube 31A. The motors 24, 25, 33, and 204 will then start to rotate continuously and the index member will begin to intermittently move the turret 17 and the shaft 89 will rotate continuously. The solenoid valve connected to the cylinder 337′ will be actuated in accordance with the description of the wiring herein, lowering the stop 336″ and allowing a glass tube to fall down into the notch at the uppermost position.

Each time the turret 17 indexes, it brings the front end of a tube into proximity with the jaws 120. The carriage 105 (FIG. 11) will be actuated by the cams 95 on the tail end of the machine and the crank 92 will act through the link 118 to swing the jaws 120 astride the tube which will grasp it. The cam 96 will then move the crank arm 107 through the link 151 which will slide the carriage 105 on the tracks 102 to advance the particular tube therewith a predetermined distance depending upon the setting of the movable pivot 108 on the arm 107 to bring the end of the tube against the stop 216 on the chuck release. This tube will then be in position to pass through the heat from the burners 28 and 29 which will heat the tube. Then as the tube is indexed to a position in front of the flare member 11, the flare member 11 will move its fingers into the end of the tube and flare the tube.

When the flare on each tube is formed, it will move into alignment with the release member 12 where it will be advanced one length, move on around with the turret 17, and will pass between the burners 28 and 29 and be held in the heat thereof while rotating. On the next indexing of the turret 17, the heated tube will move past the disk 202 which will engage the tube as it passes and cause the flared end to be broken off by thermal shock caused by the cold disc 202 touching the heated portion of the tube. As each glass tube becomes too short to be grasped by the spring 123, the secondary feeding fork 214 will catch behind the flare on the tube as it passes and move the tube on out to the next position.

When the tube supported on the turret 17 is used up beyond the point where it is engaged by the limit switch 517, the limit switch 517 will close and the feed mechanism will again allow another tube to drop from the hopper 14 into the notch 320 and the tube will be in place ready to be advanced by the tube advance mechanism shown in FIG. 11 upon the next index of the turret 17.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a machine for shaping elongated cylindrical members, said machine comprising means on said machine adjacent one end of said cylindrical members to shape an end of each said member, means on said machine to support an end of each said member in predetermined horizontal position, means on said machine to move each said member axially a predetermined amount each time a portion thereof is formed to a predetermined shape, said means to move said members comprising a track on said machine disposed generally parallel to said members supported on said machine, a carriage, means on said carriage engaging said track guiding said carriage parallel to the axes of said members, means urging said carriage to intermittently slide on said track, spaced jaws pivotally connected together and supported on said carriage, means on said jaws to engage one of said cylindrical members, means urging said jaws together when said carriage is slid to one extreme position, means to swing said jaws away from each other to release said member when said carriage has been moved to another extreme position, and means on said carriage to move said jaws laterally away from said member when said carriage has slid to said other extreme position, means advancing said cylindrical members to said jaws, heating means to heat said members, means to shape said members, and means to remove shaped portions of said cylindrical members.

2. The combination recited in claim 1 wherein said means to move said jaws laterally comprises a pin on said carriage extending upwardly and away from said member, said jaws having means thereon slidably engaging a member supporting said jaws, and a bell crank pivotally connected at one end to said carriage, at the other end to said jaws, and at an intermediate point to a link, said link being connected to an actuating mechanism on said machine actuated in synchronism with the movement of said cylindrical members.

3. The combination recited in claim 2 wherein said means to move said carriage on said track comprises a crank arm, a movable pivot member slidably supporting said crank arm, a bracket having a threaded bore therein, and a threaded rod received in said threaded bore in said bracket and extending generally parallel to said arm, said movable pivot member being pivotally connected to said bracket, said threaded rod being rotatable to move said bracket and said pivot member relative to said crank arm to change the fulcrum point thereof, said bracket being pivotally connected to said carriage at one end and to an actuating member, said actuating member swinging said arm about said pivotal connection of said pivot member to said bracket whereby said carriage slides laterally on said track, said actuating member being synchronized with the forming mechanism of said machine.

4. The combination recited in claim 3 wherein means is provided to cut off predetermined lengths of said member after a portion of said length has been shaped, said means comprising a heating member to heat a local area of said member and a disk having cooling means thereon engaging said member after it has been heated whereby said predetermined length of said member is broken off.

5. The combination recited in claim 4 wherein said means to shape said end of said member comprises heating means for said member, a flaring tool rotatably supported on said machine, said tool having two fingers thereon disposed generally parallel to the axes of said members, said flaring tool having means thereon moving it laterally to bring said fingers into said members, and means thereon to move the ends of said fingers adjacent one end of said members away from each other whereby said member end is flared.

6. A machine for shaping elongated cylindrical articles into other shapes and to cut said shapes from said elongated articles comprising turret means on said machine for supporting said cylindrical articles in horizontal position, means to heat one of the ends of each said cylindrical article, means on said machine to shape the said ends of said articles while they are heated, means on said turret to hold said cylindrical articles and to rotate them while they are being held, and index means to rotate said turret intermittently to bring said article ends into heat transfer engagement with said heat means and into operative engagement with said shaping means and to bring said article holding means into operative engagement with release means whereby said holding means is released, means to cut shaped end pieces of said elongated articles from said articles, said index means, shaping means, and means to rotate said cylindrical articles each being driven in synchronism by individual motors.

7. The machine recited in claim 6 wherein said means to heat said ends of said articles comprises gas burners disposed in the path of rotation of said articles, each said gas burner having large openings for allowing gas to escape at one side thereof and small openings to allow gas to escape at the other side thereof and thermal shock cut-off means for said elongated articles.

8. A machine for forming elongated glass members into relatively short members of predetermined shape comprising means on said machine to support a plurality of said elongated members, means on said machine to form an end portion of one said member to a predetermined shape, means on said machine to engage at an intermediate point thereon, said one elongated member having its end portion formed to move said one elongated member axially on said means for supporting it, means to remove said formed end after it has been moved axially, said machine having means to drive said forming means whereby it successively forms other said predetermined shapes on the end of said elongated member after each prior formed member has been removed therefrom, said moving means being driven to move said elongated member axially after each said formed member is formed and prior to removing said formed end, and means on said moving means engaging said formed end and moving the remaining portion of said elongated member axially in said supporting means after a plurality of said predetermined members have been removed and the remaining portion is too short to be engaged by said axially engaging member.

9. The machine recited in claim 8 wherein said means to engage said formed end of said elongated member comprises a secondary feeding fork attached to said means to move said elongated member, said secondary feeding fork extending generally parallel to said elongated member and having a portion thereof extending toward said elongated member, and a notch in said portion extending toward said elongated member, said notch receiving said elongated members adjacent said formed end and engaging said formed end to move said elongated member axially after it has been reduced in length.

10. A machine for handling glass tubes of substantial length comprising a frame, a turret rotatable intermittently about a horizontal axis on said frame, axially spaced tube support means on said turret to support said tubes, a turret head on one end of said turret having circumferentially spaced spindles thereon, one said spindle being disposed in axial alignment with a said means, means to continuously rotate said spindles, said spindles gripping the ends of said glass tubes supported in said tube support means, heating means on said machine, means on said machine to rotate said turret intermittently and stop said turret, holding said tubes in proximity to said heating means a predetermined length of time, means to engage the end of each said tube after it has been heated, shaping the end thereof, means on said machine for periodically advancing each said tube axially toward said spindles each time a said end thereof has been heated, means on said machine to advance and retract said shaping means, synchronizing means for synchronizing each said means with each other, and means to sever said shaped ends from said glass tubes.

11. The machine recited in claim 10 wherein said shaping means comprises a hollow shaft rotatably supported on said frame, said hollow shaft being rotated at a generally constant rate, an inner shaft concentrically disposed in said hollow shaft, a central axially disposed member fixed to said hollow shaft, spaced links swingably attached to said inner shaft, two bell cranks attached to said central member and attached at one end to one of said links, each said bell crank being generally U-shaped with an intermediate part, and a finger attached to a leg of each said bell crank and extending generally parallel to said intermediate part, said finger extending into the end of one of said glass tubes being swingable with said bell crank from a position generally parallel to the axes of said shafts to a position where said finger extends from the axis of said shaft and away from said tube, said finger rotating with said shafts and forming a flared portion on said heated glass tube.

12. The machine recited in claim 10 wherein said shaping means comprises a shaft rotatably supported on said frame and continuously rotatable thereon and disposed generally parallel to said glass tubes, two fingers disposed generally parallel to said tubes, and means to swing the ends of said fingers remote from said tubes outward as said fingers rotate with said shaft whereby the ends of said tubes adjacent to said fingers are flared.

13. The machine recited in claim 10 wherein said means to sever said ends of said glass tubes after they are shaped comprises means to heat a local circumferential portion of each said tube, and means to engage said heated portion of said tube with a relatively cold member.

14. A machine for forming elongated, generally round members made of material which becomes ductile upon heating comprising means for supporting said elongated members in a horizontal position, holding means engaging said elongated members adjacent one end only to rotate said elongated members, heating means heating a predetermined part of said elongated members adjacent one end, shaping means engaging said elongated members after they have been heated a predetermined length of time, shaping the end thereof adjacent said holding means, cut-off means on said machine for cutting off said ends of said elongated members when shaped, means to receive end portions of said elongated members cut off by said cut-off means, and means to advance said elongated members axially toward said shaping means each time a said shaped end is cut off.

References Cited in the file of this patent
UNITED STATES PATENTS

| | | |
|---|---|---|
| 557,105 | Bridges | Mar. 31, 1896 |
| 566,514 | Gaubert | Aug. 25, 1896 |
| 602,677 | Buttler | Apr. 19, 1898 |
| 709,724 | Ripley | Sept. 23, 1902 |
| 1,536,833 | Fagan et al. | May 5, 1925 |
| 1,546,353 | Rippl et al. | July 14, 1925 |
| 1,643,215 | Koenig | Sept. 20, 1927 |
| 1,888,851 | Donovan et al. | Nov. 22, 1932 |
| 1,932,141 | Miller | Oct. 24, 1933 |
| 1,981,692 | Dichter | Nov. 20, 1934 |
| 2,284,089 | Hahn et al. | May 26, 1942 |
| 2,323,182 | Stuckert | June 29, 1943 |
| 2,364,673 | Stuckert et al. | Dec. 12, 1944 |
| 2,394,115 | Snyder | Feb. 5, 1946 |
| 2,475,915 | Orr | July 12, 1949 |
| 2,534,547 | Eisler | Dec. 19, 1950 |
| 2,575,746 | Cartun | Nov. 20, 1951 |
| 2,582,818 | Coby | Jan. 15, 1952 |
| 2,596,899 | Kahle | May 13, 1952 |
| 2,615,285 | Gosnell et al. | Oct. 28, 1952 |
| 2,641,870 | Eisler | June 16, 1953 |
| 2,675,647 | Roeber | Apr. 20, 1954 |
| 2,699,630 | Alm et al. | Jan. 18, 1955 |
| 2,857,044 | Mullan | Oct. 21, 1958 |